United States Patent
Deckers et al.

[11] Patent Number: 6,149,851
[45] Date of Patent: Nov. 21, 2000

[54] TOOLING APPARATUS AND METHOD FOR PRODUCING GRID STIFFENED FIBER REINFORCED STRUCTURES

[75] Inventors: Mark E. Deckers, Salt Lake City; Vernon M. Benson, South Jordan; Michael R. McCloy; Todd A. Rosevear, both of Salt Lake City, all of Utah

[73] Assignee: Alliant Techsystems Inc., Hopkins, Minn.

[21] Appl. No.: 09/070,420

[22] Filed: Apr. 30, 1998

[51] Int. Cl.[7] .................................................. B29C 70/44
[52] U.S. Cl. ............................ 264/219; 249/64; 249/176; 249/177; 264/257; 264/313; 264/314; 425/389; 425/468; 425/DIG. 44
[58] Field of Search .......................... 425/389, DIG. 44, 425/468; 264/313, 314, 219, 257; 249/176, 177, 64

[56] References Cited

U.S. PATENT DOCUMENTS

| | | | |
|---|---|---|---|
| 2,782,469 | 2/1957 | Hargraves et al. | 249/176 |
| 3,290,421 | 12/1966 | Miller, Jr. | 249/177 |
| 3,363,875 | 1/1968 | Hedgewick et al. | 425/468 |
| 3,551,237 | 12/1970 | Cox et al. | 156/175 |
| 3,574,040 | 4/1971 | Chitwood et al. | 156/522 |
| 3,772,126 | 11/1973 | Myers | 156/434 |
| 3,962,393 | 6/1976 | Blad | 264/313 |
| 4,137,354 | 1/1979 | Mayes, Jr. et al. | 156/175 |
| 4,248,649 | 2/1981 | Harrison et al. | 156/174 |
| 4,470,860 | 9/1984 | Gill et al. | 156/175 |
| 4,508,584 | 4/1985 | Charles | 156/353 |
| 4,633,632 | 1/1987 | Sarh | 52/245 |
| 4,702,870 | 10/1987 | Setterholm et al. | 264/313 |
| 4,735,672 | 4/1988 | Blad | 156/433 |
| 4,872,619 | 10/1989 | Vaniglia | 156/574 |
| 4,877,183 | 10/1989 | Vaniglia | 156/574 |
| 4,881,714 | 11/1989 | Koppenberg | 249/177 |
| 4,907,754 | 3/1990 | Vaniglia | 156/425 |
| 4,938,824 | 7/1990 | Youngkelt | 156/173 |
| 4,943,338 | 7/1990 | Wisbey | 156/443 |
| 5,015,326 | 5/1991 | Frank | 156/511 |
| 5,045,147 | 9/1991 | Benson et al. | 156/429 |
| 5,110,395 | 5/1992 | Vaniglia | 156/353 |
| 5,131,834 | 7/1992 | Potter | 425/389 |
| 5,145,543 | 9/1992 | Redd et al. | 156/171 |
| 5,152,949 | 10/1992 | Leoni et al. | 425/389 |
| 5,173,315 | 12/1992 | Charlson et al. | 425/403 |
| 5,200,251 | 4/1993 | Brand | 428/156 |
| 5,233,737 | 8/1993 | Policelli | 285/390 |
| 5,290,389 | 3/1994 | Shupe et al. | 156/425 |
| 5,472,553 | 12/1995 | Roberts | 156/353 |
| 5,698,066 | 12/1997 | Johnson et al. | 156/523 |
| 5,814,386 | 9/1998 | Vasiliev et al. | 156/169 |
| 5,871,117 | 2/1999 | Protasov et al. | 220/592 |
| 5,876,835 | 3/1999 | Noble et al. | 264/313 |

FOREIGN PATENT DOCUMENTS

| | | | |
|---|---|---|---|
| 221120 | 4/1985 | Germany | 264/313 |
| 63-183831 | 7/1988 | Japan | 425/389 |

OTHER PUBLICATIONS

Ingersol Sales Brochure entitled "Automated Machinery for Composite Manufacturing," dated Aug. 9, 1989, pp. 1–3, 5–7.

*Primary Examiner*—Robert Davis
*Attorney, Agent, or Firm*—Trask Britt

[57] ABSTRACT

A method and apparatus for the manufacture of fiber reinforced structures. The tooling and its use for the manufacture of reinforced structures is described and illustrated.

78 Claims, 18 Drawing Sheets

TOOLING APPARATUS AND METHOD FOR PRODUCING GRID STIFFENED FIBER REINFORCED STRUCTURES

BACKGROUND OF THE INVENTION

1. Field of the Invention

This invention relates to the method and apparatus for the manufacture of fiber reinforced structures.

2. State of the Art

It is desirable to have inexpensive, strong, lightweight, easily manufactured, dimensionally accurate components in a variety of sizes and geometries for use in aircraft and aerospace applications. However, meeting such criteria for components is difficult.

For example, commercial aircraft are typically powered using turbofan type engines. A turbofan type engine includes a ducted fan, a large diameter axial-flow multi-stage compressor, as the primary source of thrust by the engine while the gas generator portion of the engine provides a smaller amount of the engine's thrust. Each stage of the ducted fan includes a number of fan blades attached to a rotating fan disc or hub to compress air, the compressed air flowing from the fan and expanding through a nozzle to provide thrust to move the aircraft. Depending upon the size of the engine, the diameter of each stage of the ducted fan may be approximately one meter to several meters or more in diameter and rotate at several thousand revolutions per minute. Each fan blade attached to a fan disc or hub being a highly stressed structure due to the forces acting on the blade from compressing the air flowing therearound and from the centrifugal forces acting on the blade during rotation of the engine.

Since weight is of concern in aircraft engines, it is desirable to provide the lightest engine possible to meet the operational criteria for the aircraft while providing the required aircraft operational safety. One of the desired operational safety characteristics for a turbofan aircraft engine is that if a fan blade catastrophically fails during engine operation, the blade or pieces of the blade be contained or caught within the fan housing structure to prevent damage to the aircraft, its cargo, and the surrounding engine and aircraft environment. Typically, aircraft manufactures have required the fan housing be such a structure for the engine thereby making the fan housing one of the heaviest engine components.

The design of an inexpensive, strong, lightweight, easily manufactured, dimensionally accurate fan housing in a variety of sizes and geometries for use in aircraft is a formidable task. For instance, the fan housing must be strong enough to contain the energy of a fan blade when the failure occurs at maximum engine speed, must be dimensionally accurate over a range of engine operating conditions, must be easily manufactured at a reasonable cost, must be lightweight, etc. Typically, fan housings have been metal structures using a variety of reinforcing grids, typically formed of metal. However, such fan housings are expensive, difficult to manufacture, require extensive tooling to manufacture to close tolerances, and heavy.

In other instances, some fan housings have been composite type structures including metal components and non-metallic or organic type reinforcing components in an attempt to provide a high strength, lightweight structure capable of containing a broken fan blade. However, such composite type structures are difficult to construct because the reinforcing structure of non-metallic materials for the fan housing has been difficult and expensive to construct. Typically, such a non-metallic reinforcing structure has employed an isogrid type structure which is difficult to reliably fabricate in quantities. The isogrid type structure being efficient in providing reinforcing for the fan housing and the ability of catching a broken fan blade while maintaining its strength and integrity even with a portion missing or broken.

Typically, such composite isogrid structures have been fabricated by hand using soft imprecise tooling of wood, resilient materials, etc. which affects the isogrid structure's repeatability in manufacture, dimensional tolerance variation, structural integrity, cost, etc. Therefore, a need exists for a method and apparatus for the fabrication of composite structures, such as an isogrid structure, to maintain the integrity, reliability, repeatability of manufacture, dimensional control, and cost of the structure.

SUMMARY OF THE INVENTION

The present invention relates to the method and apparatus for the manufacture of fiber reinforced structures. The present invention includes the tooling and its use for the manufacture of reinforced structures.

DESCRIPTION OF THE INVENTION

Figure 1:
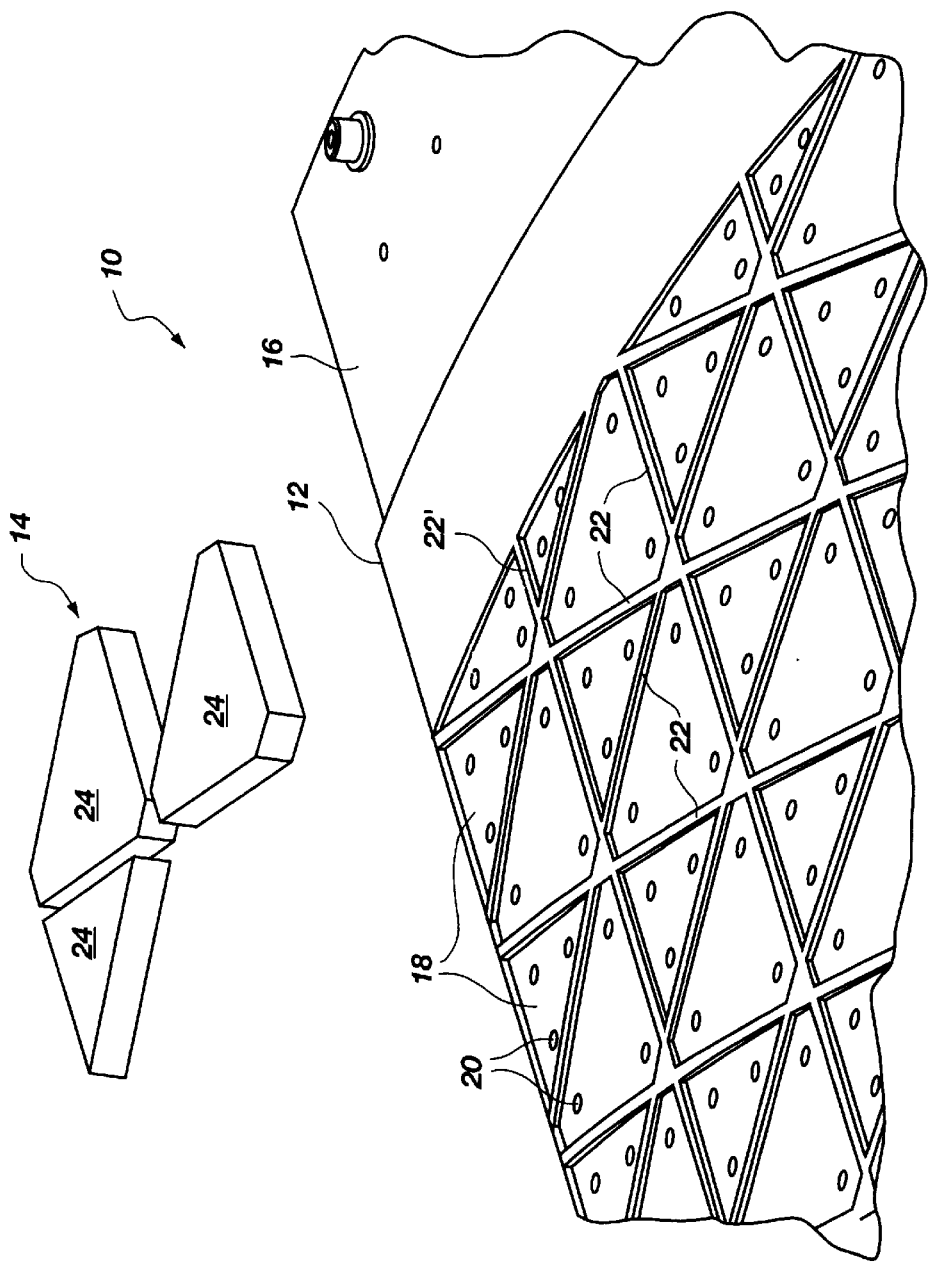
FIG. 1 is a view of a portion of the tooling used in a first embodiment of the present invention.

Referring to drawing FIG. 1, illustrated is a portion of the tooling assembly 10 of the present invention including a portion of the hard tooling 12 and the consolidation medium 14. The hard tooling 12 may be formed in any desired convenient shape or configuration, such as flat, annular, circular, conical, pyramidal, rectangular, etc., for the manufacture of a reinforced structure, such as an isogrid structure, or any convenient desired composite reinforced structure. In this instance, the portion of the hard tooling 12 includes a metal sheet 16 having a plurality of recessed pockets 18 therein having, in turn, a plurality of apertures 20 therein and a plurality of ribs 22 for the support of the composite fiber material (not shown) applied thereto extending between the recessed pockets 18. The recessed pockets 18 and ribs 22 may be any desired shape or configuration for the desired composite structure to be formed. Each recessed pocket 18 may have any desired number of apertures 20 therein used to receive and retain a portion of the consolidation medium 14 therein. The ribs 22 may be of any desired width or shape depending upon the composite structure to be formed on the hard tooling by the application of composite fiber thereto. If desired, the hard tooling 12 may not have recessed pockets 18 formed therein but merely contain a plurality of apertures 20 therein.

The consolidation medium 14 includes a plurality of individual consolidation blocks 24, each block having a shape to fit within a corresponding recessed pocket 18 of the hard tooling 12. The shape of each consolidation block 24 being the desired shape of the corresponding recessed pocket 18. Each consolidation block 24 having a thickness or height sufficient to allow the formation of the desired composite structure on the hard tooling 12 when the consolidation block 24 has been assembled thereon in a corresponding recessed pocket 18. Each consolidation block 24 is formed from any desired structural material capable of holding its shape during the formation of the composite structure during fabrication and curing, such as steel, aluminum, titanium, alloys thereof, silicon elastomeric material, high durometer elastomeric material, high melting temperature plastic material, ceramic material, etc. The consolidation blocks 24 and the hard tooling 12 should be easily machinable or formable for the desired composite structure to be formed therewith as well as it is desirable for them to be light weight for handling purposes. The consolidation blocks 24 are retained within the recessed pockets 18 of the hard tooling 12 by any suitable means, such as pin connections, threaded connections, resilient spring connections, etc. For precision control of the composite structure to be formed using the hard tooling 12 each consolidation block 24 should fit within its corresponding recessed pocket 18 with a minimum of clearance, such as, for instance, 0.010 inches clearance. In this manner, the composite structure to be formed using the consolidation blocks 24 and hard tooling 12 may be precisely controlled dimensionally.

Figure 2:
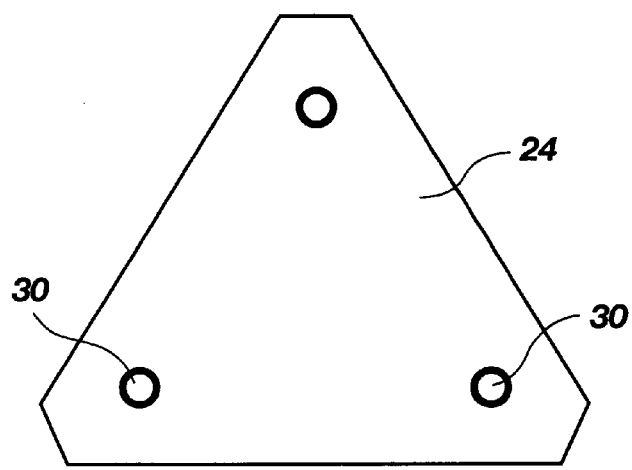
FIG. 2 is bottom view of a tooling block used in the present invention.

Referring to drawing FIG. 2, a consolidation block 24 is illustrated from the bottom thereof. The consolidation block 24 includes a plurality of pins or nubs 30 thereon which are received within apertures 20 of the metal sheet 16 of the hard tooling 12 (see FIG. 1). As stated, the consolidation block 24 may be of any desired shape to form the composite structure to be formed using the consolidation blocks 24 and hard tooling 12 as well as any desired number of pins 30 to be included on a consolidation block 24 to precisely retain a consolidation block 24 within the recessed pocket 18.

Figure 3:
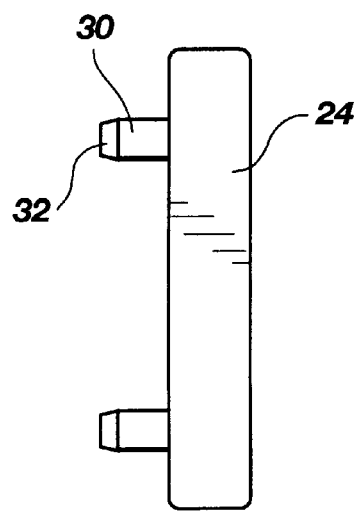
FIG. 3 is a side view of the tooling block illustrated in drawing FIG. 2 used in the present invention.

Referring to drawing FIG. 3, a consolidation block 24 of consolidation medium 14 is illustrated from a side view with the plurality of pins 30 thereon which are received within apertures 20 of the metal sheet 16 of hard tooling 12 to locate and retain the consolidation block 24 within the recessed pocket 18. The pins 30 may be of any desired length, size, and suitable material for the precise location and retention of the consolidation block 24 on the hard tooling 12. Each pin may, if desired, include an annular chamfered surface 32 thereon to aid in the insertion of the consolidation block 24 within an aperture 20 of the metal sheet 16 of hard tooling 12.

Figure 4:
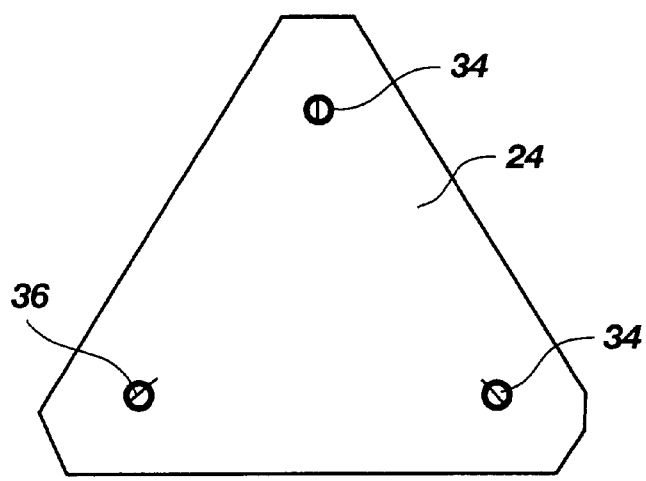
FIG. 4 is a bottom view of another tooling block used in the present invention.

Referring to drawing FIG. 4, a consolidation block 24 of consolidation medium 14 is illustrated from the bottom thereof having an alternative resilient or spring type connections 34 thereon. As illustrated, the consolidation block 24 includes a plurality of resilient spring type connections 34 thereon which are received within apertures 20 of the metal sheet 16 of the hard tooling 12 (see FIG. 1). As stated, the consolidation block 24 may be of any desired shape to form the composite structure to be formed using the consolidation blocks 24 and hard tooling 12 as well as any desired number of resilient spring type connections 34 to be included on a consolidation block 24 to precisely retain a consolidation block 24 within the recessed pocket 18. The resilient spring type connections 34 may have a pin (not shown) or suitable member inserted through the end portion 36 thereof to retain the resilient spring type connection 34 in the aperture 20 in the metal sheet 16 of the hard tooling 12.

Figure 5:
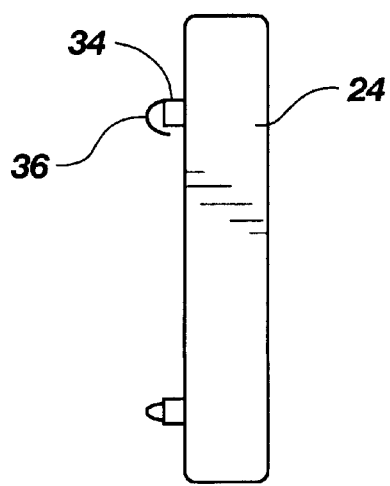
FIG. 5 is a side view of the tooling block illustrated in drawing FIG. 4 used in the present invention.

Referring to drawing FIG. 5, a consolidation block 24 of the consolidation medium 14 is illustrated from a side view with the plurality of resilient spring type connections 34 thereon which are received within apertures 20 of the metal sheet 16 of hard tooling 12 to locate and retain the consolidation block 24 within the recessed pocket 18. The resilient spring type connections 34 may be of any desired length, size, and suitable material for the precise location and retention of the consolidation block 24 on the hard tooling 12. Each resilient spring type connection 34 may, if desired, include an end portion 36 thereon to engage a pin (not shown) or other suitable member to retain the resilient spring type connection 34 within an aperture 20 of the metal sheet 16 of hard tooling 12.

Figure 6:
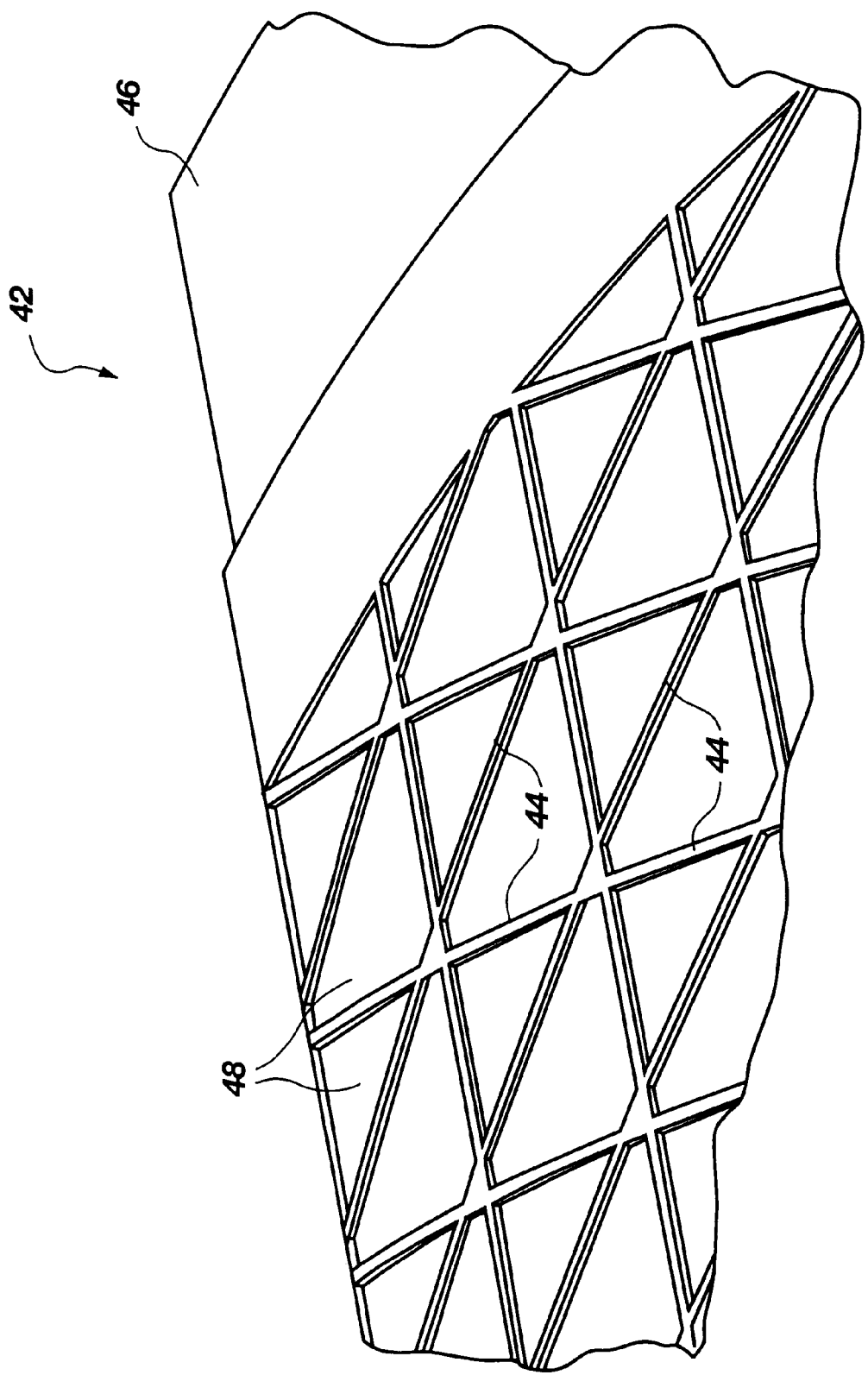
FIG. 6 is a view of a portion of the tooling used in a first embodiment of the present invention to mate with the portion of the tooling illustrated in drawing FIG. 1 of the present invention.

Referring to drawing FIG. 6, a mating piece of tooling 42, also preferred to be hard tooling, is illustrated which mates with hard tooling 12 and consolidation blocks 24 after the formation of a desired composite structure thereon, the mating piece of tooling 42 to be used during the curing of the composite structure. The mating piece of tooling 42 includes a hard tooling sheet 46 having a plurality of recessed pockets 48 wherein to receive a portion of a corresponding consolidation block 24 of consolidation medium 14 therein and having a plurality of ribs 44 formed between the recessed pockets 48 located to correspond to the ribs 22 of the metal sheet 16 of the hard tooling 12 to retain the composite structure therebetween during curing. The mating piece of tooling 42 is formed as a mirror image of the hard tooling 12 and consolidation blocks 24. The mating piece of tooling 42 may be formed of any desired material for use in the curing process of the composite structure having sufficient strength during the elevated temperatures of the curing process of the composite structure.

Figure 7:
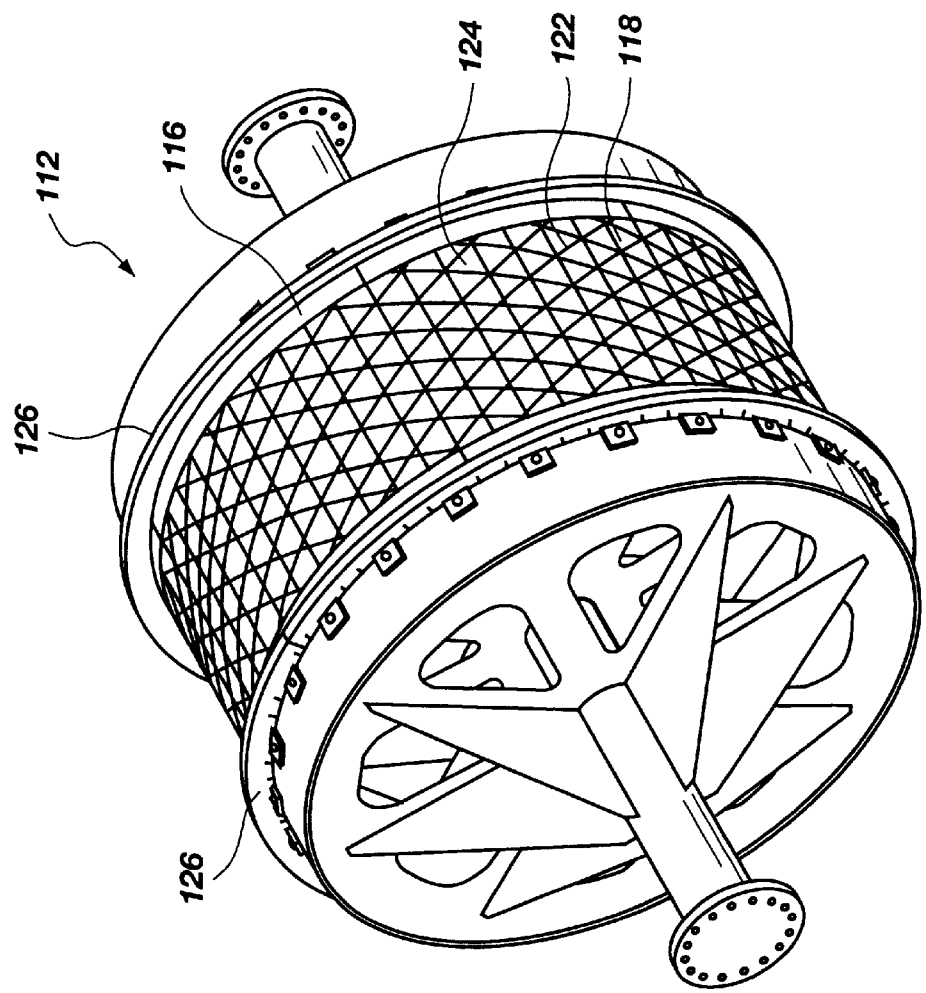
FIG. 7 is a view of a portion of the tooling of the first embodiment of the present invention in a circular drum type configuration.

Referring to drawing FIG. 7, hard tooling 112 in an annular configuration having consolidation blocks 124 thereon is illustrated for forming an annular shaped composite structure thereon. The hard tooling 112 includes a hard sheet 116 of any suitable material having a plurality of consolidation blocks 124 retained with recessed pockets 118 having ribs 122 formed therebetween upon which the composite structure is formed. The hard tooling 112 may be of any suitable convenient shape for the forming of the annular shaped composite structure thereon for use on any suitable apparatus for the support of the hard tooling 112. The consolidation blocks 124 may formed as described herein of any desired shape using any suitable desired connection to the hard tooling 112 to retain the consolidation blocks 124 in the recessed pockets 118 therein. The hard tooling 112 may be formed in segments, any suitable desired number and shape, which are secured together to form the annular hard tooling 112. The hard tooling 112 may include flanges 126 thereon for use in the formation and curing of the composite structure formed on the hard tooling 112.

Figure 8:
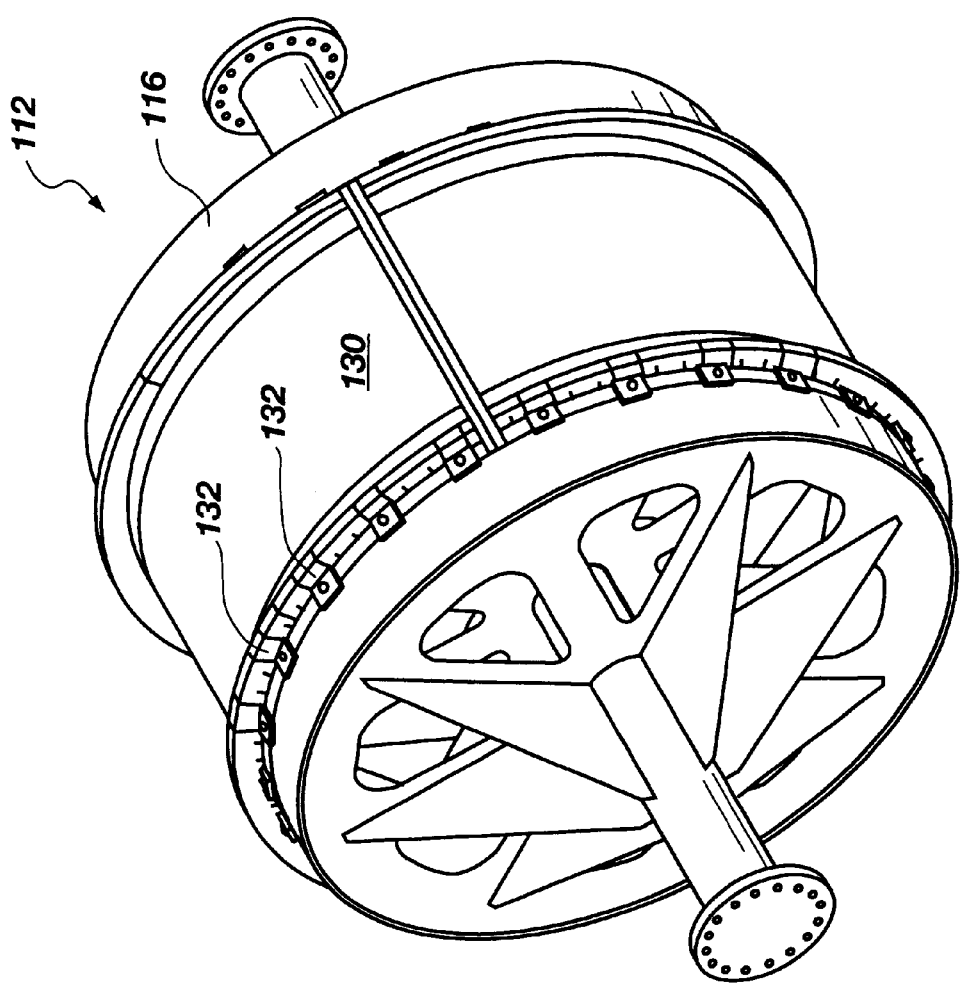
FIG. 8 is a view of a portion of the tooling of the first embodiment of the present invention in a circular drum type configuration with a cover thereon.

Referring to drawing FIG. 8, the hard tooling 112 is illustrated having a cover 130, preferably of hard tooling, installed over the area of the tooling 112 containing the recessed pockets 118 and consolidation blocks 124 (See FIG. 7) for use in the curing of the composite structure formed on the hard tooling 112. The cover 130 may be of any suitable material for use during curing of the composite structure at an elevated temperature, such as aluminum, titanium, steel, etc. The cover 130 and the hard tooling 112 should be light weight for handling purposes as well as possess sufficient strength for the loading of the composite structure during the curing process. The cover 130 may be secured to the hard tooling 112 by any suitable fastener arrangement, such as the use of clamps and threaded fasteners 132.

Figure 9:
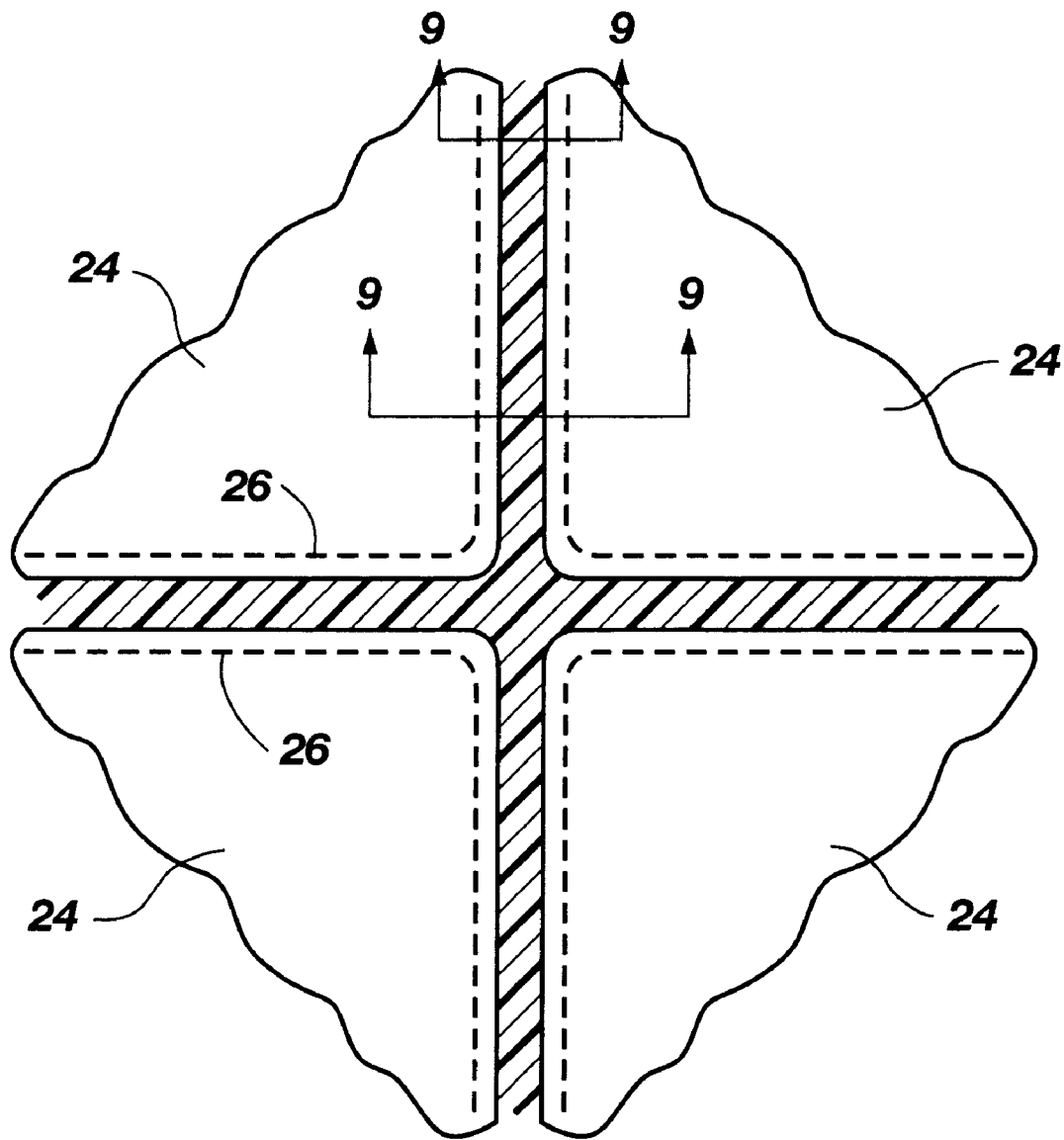
FIG. 9 is a top view of a portion of the tooling used in the present invention with material located thereon.

Referring to drawing FIG. 9, a portion of the hard tooling 12 or 112, without a cover 130 thereover, is illustrated at the juncture of four consolidation blocks 24 or, alternately, 124 (not shown). The consolidation blocks 24 may each include, if desired, a profiled edge thereon to retain the fiber material on the hard tooling 12 or 112 during the formation and curing of the composite structure thereon. The profiled edge 26 may be of any suitable shape, both vertically or longitudinally around a portion or the entire periphery of the consolidation block 24, to retain or contain the fiber material and the coating on the hard tooling 12 or 112.

Figure 10:
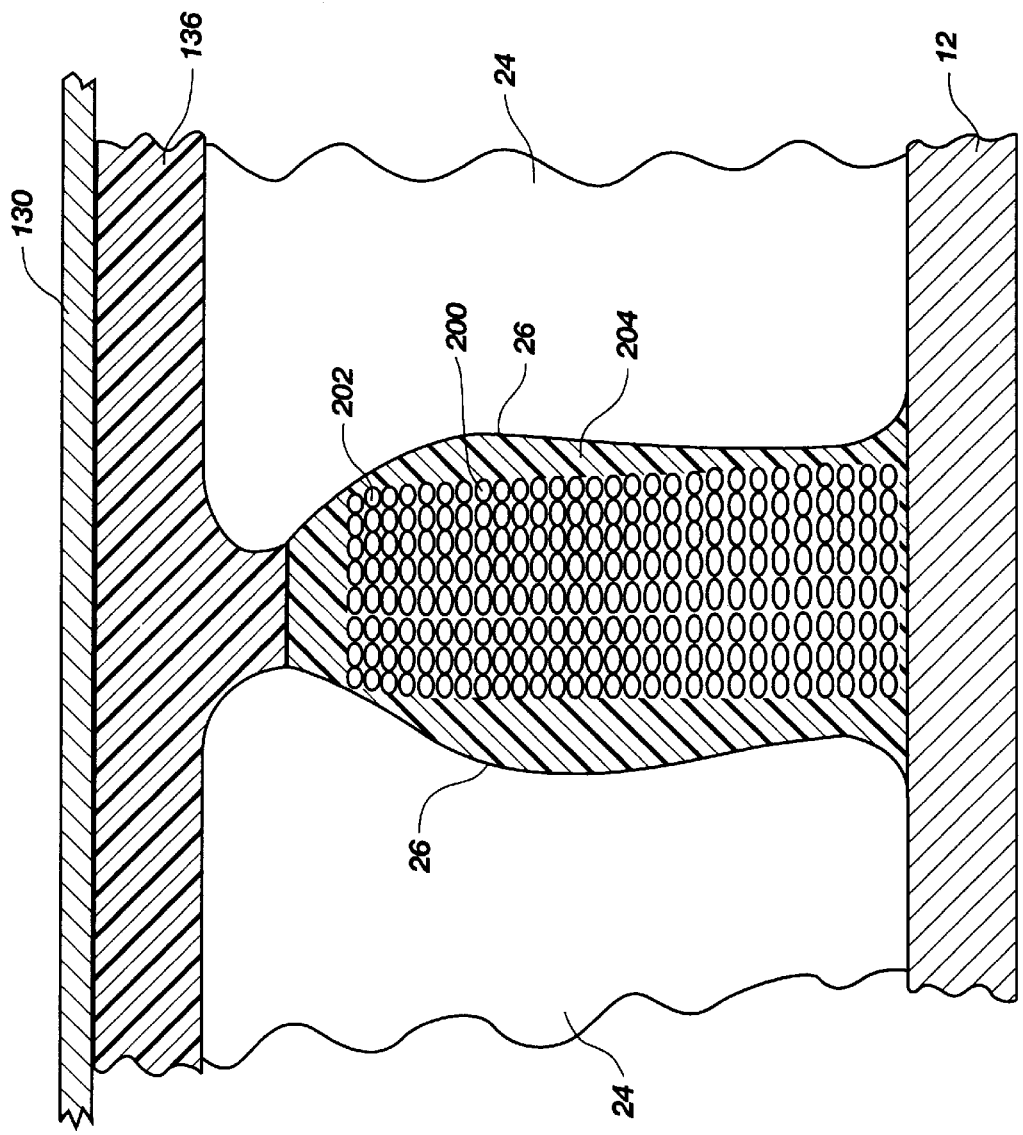
FIG. 10 is a cross-sectional view of a portion of the tooling of the first embodiment of the present invention and a portion of a grid structure formed thereon.

Referring to drawing FIG. 10, a portion of a composite structure formed on hard tooling 12, or 112 (not shown) with consolidation blocks 24 and cover 130 is illustrated as depicted along lines 9—9 of drawing FIG. 9. As illustrated, the consolidation blocks 24 have the profiled edge 26 thereof having a suitable vertical profile adjacent the composite structure being formed on the hard tooling 12. The profiled edge 26 may be of any suitable shape and may vary from consolidation block 24 to adjacent consolidation block 24, as illustrated. The purpose of the profiled edge 26 on the consolidation block 24 is to confine and retain the fiber material 200 which includes fibers 202 and coating material 204 thereon, either as individual strands or as multiple strand tows on the hard tooling 12, during the lay-up of the fiber material 200 and the subsequent curing of the fiber material 200 including the fibers 202 and their coating 204 to form a composite structure. The profiled edge 26 on the consolidation block 24 acts to control the placement and movement of the fiber material 200 and its coating material 204, particularly during the curing thereof as the coating material 204 flows to assume the shape of the area present between the consolidation blocks 24 and the hard tooling 12. Additionally illustrated is the cover 130 used during curing of the fiber material 200 to form the composite structure and a suitable resilient member 136 located between the cover 130 and the fiber material 200 formed on the hard tooling 12. The resilient member 136 is used to confine and load the fiber material 200 during the curing thereof and in the area between the consolidation blocks 24 of the consolidation medium 14 and the hard tooling 12. The resilient member 136 may be of any suitable resilient material for use in the curing of the fiber material at elevated temperatures to form the composite structure, such as synthetic rubber, neoprene, etc. Similarly, the resilient member 136 may have any suitable thickness for such use depending upon the composite structure being formed. As illustrated, the coating material 204 has been substantially flowed from around the fibers 202 of the fiber material 200 during the curing process to take the shape of the area formed between the consolidation blocks 24, the hard tooling 12, and the resilient member 136 backed-up by cover 130. In this manner, the profiled edges 26 of the consolidation blocks 24 act to control the placement of fibers 202 during formation and curing of the composite structure to provide accurate dimensional control of the composite structure formed. In this manner, dimensions may be precisely controlled for the composite structure and, more particularly, repeated to form additional composite structures using the hard tooling 12 and consolidation blocks 24 of the consolidation medium 14. If desired, the resilient member 136 may be used without cover 130 during the curing of the composite structure if the resilient member 136 has sufficient strength for such use without substantial deflection or movement thereof.

Figure 11:
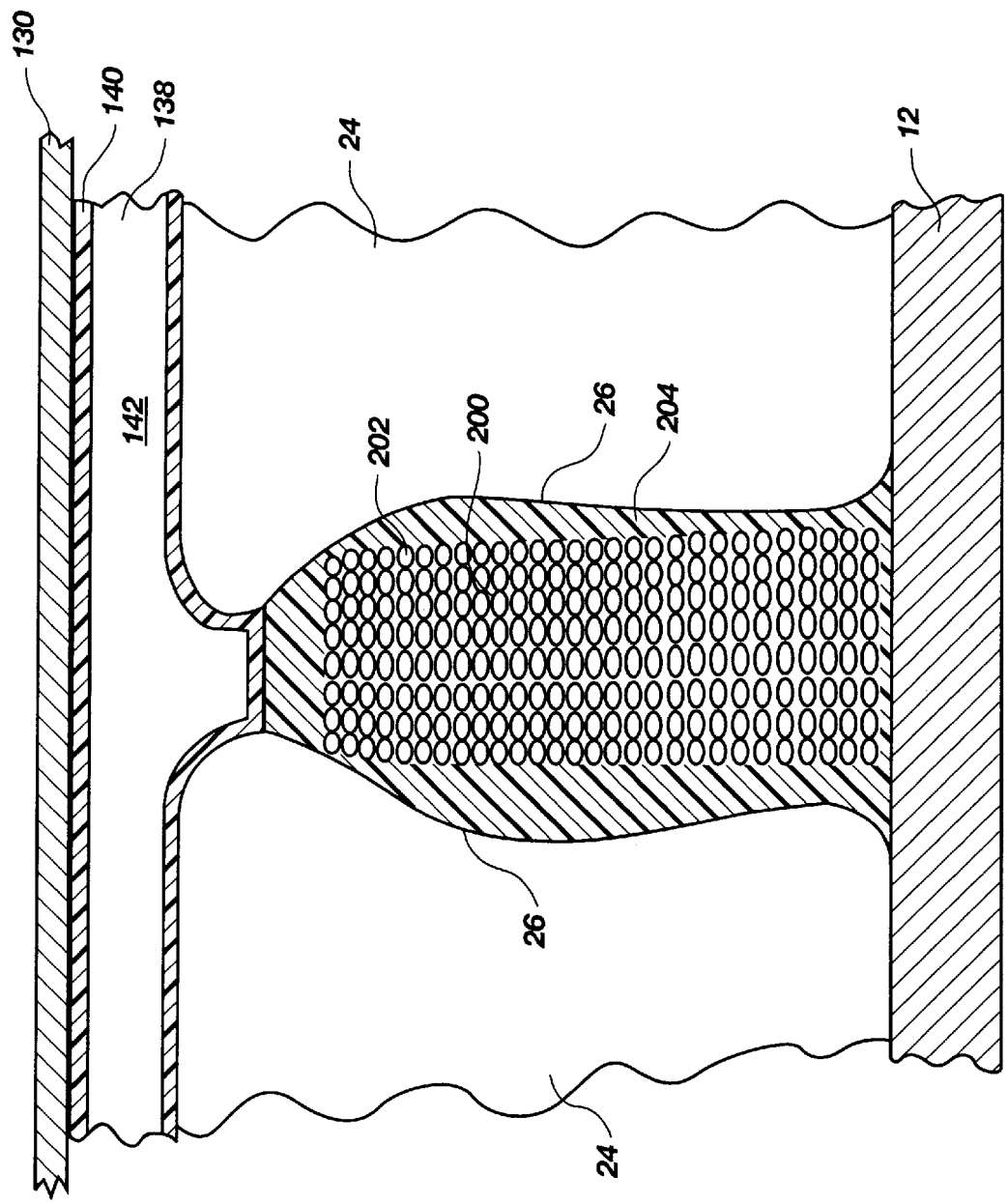
FIG. 11 is a cross-sectional view of a portion of the tooling of a second embodiment of the present invention and a portion of a grid structure formed thereon.

Referring to drawing FIG. 11, an alternative arrangement of a portion of a composite structure formed on hard tooling 12, or 112 (not shown) with consolidation blocks 24 and cover 130 is illustrated as depicted along lines 9—9 of drawing FIG. 9. As illustrated, the consolidation blocks 24 have the profiled edge 26 thereof having a suitable vertical profile adjacent the composite structure being formed on the hard tooling 12. The profiled edge 26 may be of any suitable shape and may vary from consolidation block 24 to adjacent consolidation block 24, as illustrated. The purpose of the profiled edge 26 on the consolidation block 24 is to confine and retain the fiber material 200 which includes fibers 202 and coating material 204 thereon, either as individual strands or as multiple strand tows on the hard tooling 12, during the lay-up of the fiber material 200 and the subsequent curing of the fiber material 200 including the fibers 202 and their coating material 204 to form a composite structure. The profiled edge 26 on the consolidation block 24 acts to control the placement and movement of the fiber material 200 and its coating material 204, particularly during the curing thereof as the coating material 204 flows to assume the shape of the area present between the consolidation blocks 24 and the hard tooling 12. Additionally illustrated is the cover 130 used during curing of the fiber material 200 to form the composite structure and a suitable resilient member 138 located between the cover 130 and the fiber material 200 formed on the hard tooling 12. The resilient member 138 being an inflatable type member having a resilient cover 140 and inflation cavity 142 therein is used to confine and load the fiber material 200 during the curing thereof and in the area between the consolidation blocks 24 and the hard tooling 12. The resilient member 138 may be of any suitable resilient material for use in the curing of the fiber material at elevated temperatures to form the composite structure, such as synthetic rubber, neoprene, etc. capable of withstanding the inflation pressures used for loading of the fiber material 200 during the curing thereof. If formed to have sufficient strength, a suitable inflatable resilient member 138 may be used without a cover 130. The resilient member 138 may be inflated using any desired gas, such as air, nitrogen, etc., as desired. The inflation pressure in cavity 142 may be monitored remotely in real time during the curing process, if desired, to insure the proper application of pressure to the fiber material 200 during the curing thereof. Similarly, the resilient member 138 may have any suitable thickness for such use depending upon the composite structure being formed. As illustrated, the coating material 204 has been substantially flowed from around the fiber 202 of the fiber material 200 during the curing process to take the shape of the area formed between the consolidation blocks 24, the hard tooling 12, and the resilient member 138 backed-up by cover 130. In this manner, the profiled edges 26 of the consolidation blocks 24 act to control the fiber 202 placement during formation and curing of the composite structure to provide accurate dimensional control of the composite structure formed. In this manner, dimensions may be precisely controlled for the composite structure and, more particularly, repeated to form additional composite structures using the hard tooling 12 and consolidation blocks 24.

Figure 12:
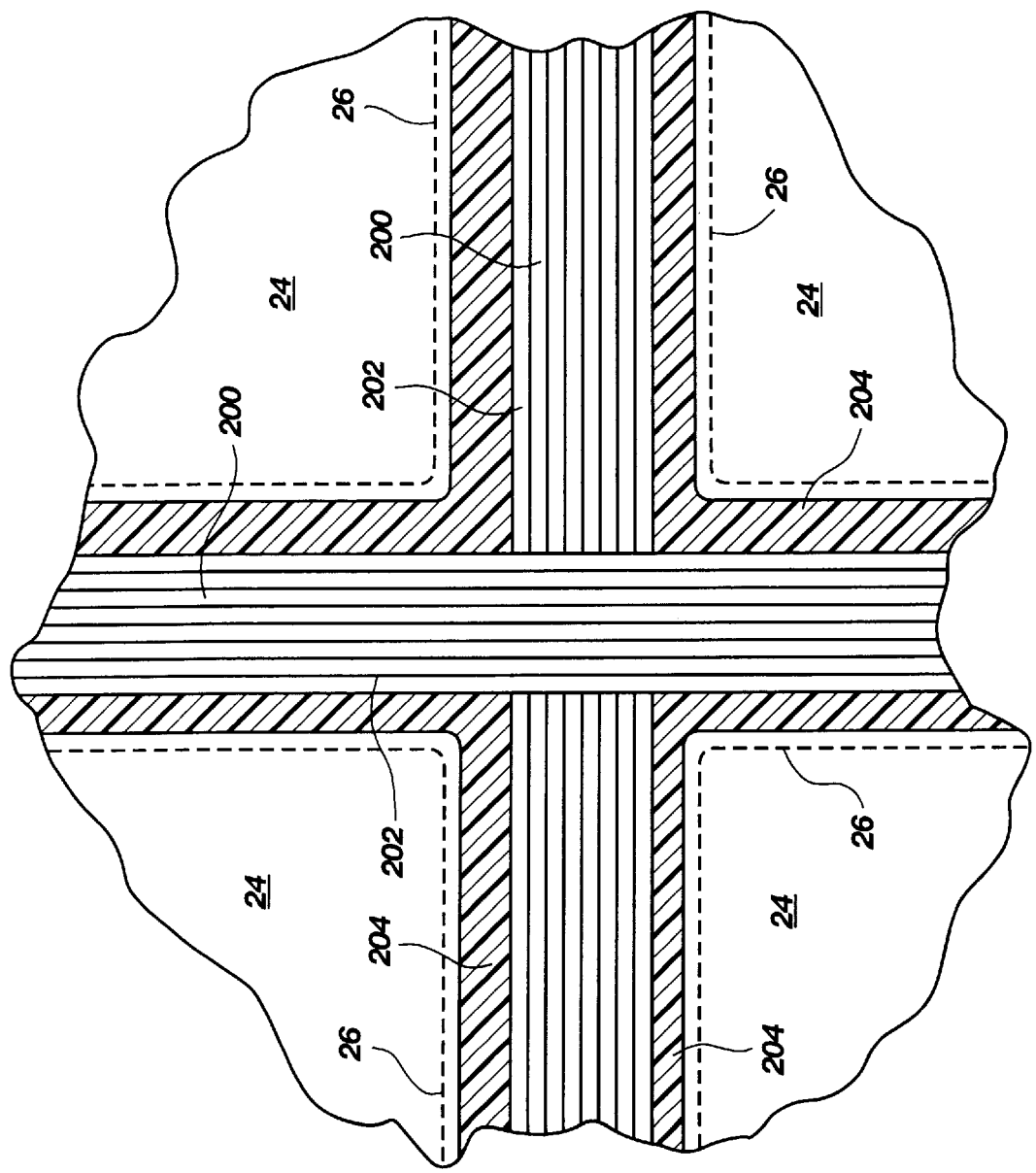
FIG. 12 is a top view of a portion of the tooling of the present invention and a portion of a grid structure formed thereon.

Referring to drawing FIG. 12, illustrated is a view of the cured composite structure formed by the fiber material 200 between hard tooling 12 or 112 (not shown) and the consolidation blocks 24. As illustrated, the fibers 202 overlay each other at the intersection thereof with the coating material 204 being retained by and assuming the desired profile shape of the profiled edges 26 of the consolidation blocks 24. In this manner, precise control of the shape and dimensions of the composite structure being formed on the hard tooling 12 or 112 using consolidation blocks 24 is provided on a repeatable basis for forming multiple composite structures using the same hard tooling 12 or 112 and consolidation blocks 24.

Figure 13:
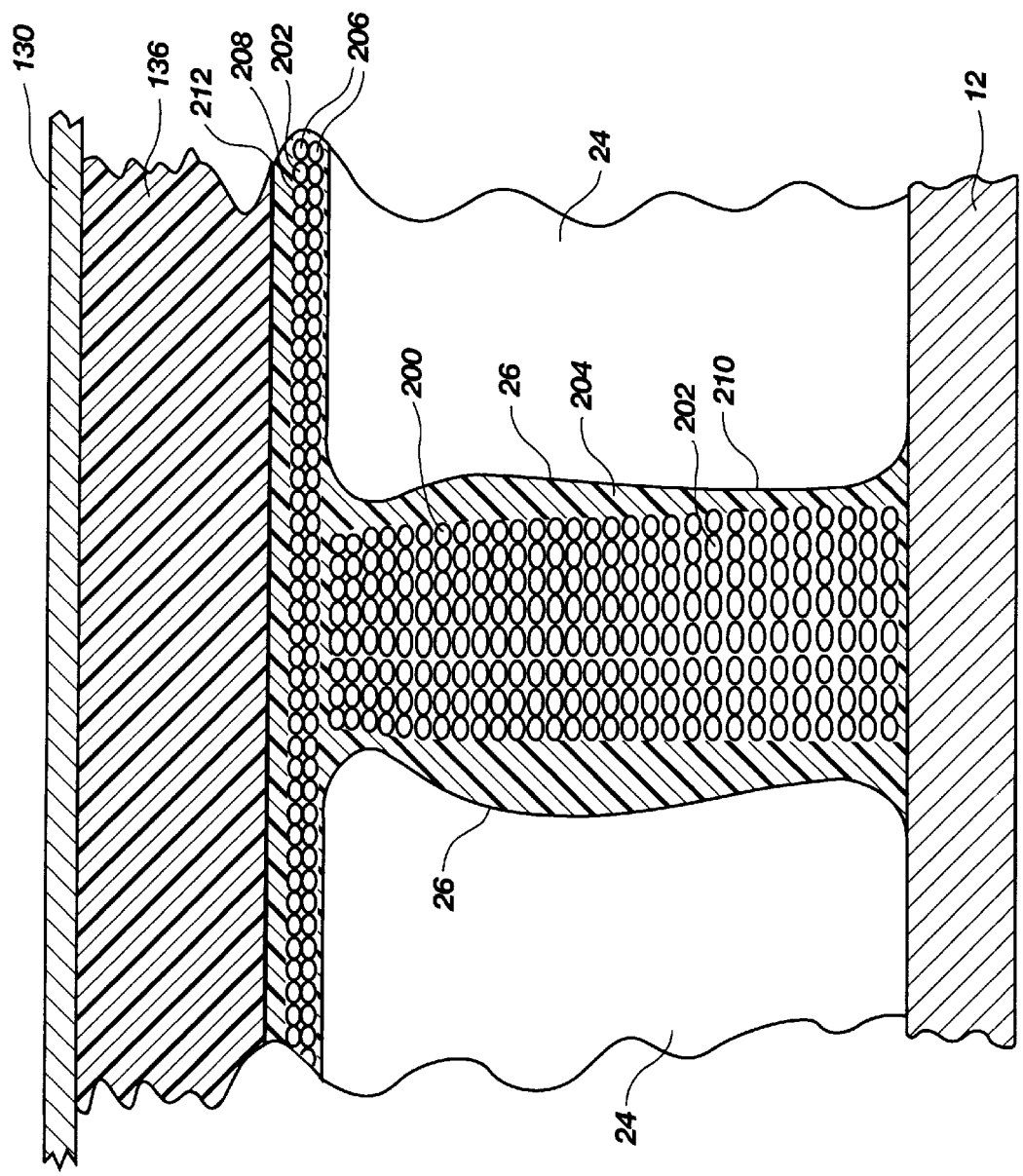
FIG. 13 is a cross-sectional view of a portion of the tooling for a third embodiment of the present invention.

Referring to drawing FIG. 13, a portion of a composite structure formed on hard tooling 12, or 112 (not shown), with consolidation blocks 24 and cover 130 is illustrated. The consolidation blocks 24 have profiled edge 26 having a suitable vertical profile adjacent the composite structure being formed on hard tooling 12. The profiled edge 26 may be of any suitable shape and may vary from consolidation block 24 to adjacent consolidation block 24, as illustrated. The purpose of the profile edge 26 on the consolidation block 24 is to confine and retain the fiber material 200 which includes fiber 202 and coating material 204 thereon, either as individual strands or as multiple strand tows on the hard tooling 12 during the lay-up of the fiber material 200 and the subsequent curing of the fiber material 200 including the fibers 202 and their coating material 204 to form a composite structure. The profiled edge 26 on the consolidation block 24 acts to control the placement and movement of the fiber material 200 and its containing coating material 204, particularly during the curing thereof as the coating flows to assume the shape of the area present between the consolidation blocks 24 and the hard tooling 12. Additionally illustrated are multiple layers 206 of fibers 202 having a coating 208 thereon which are placed on the exterior of consolidation blocks 24 and the upper extent of the fibers 202 forming the ribs 210 of the composite structure while the layers 206 of fibers 202 form the shell or cover 212 of the composite structure. The layers 206 being placed over the ribs 210 after the formation thereof on the hard tooling 12 including consolidation blocks 24 thereon. The resilient member 136 may be of any suitable resilient material for use in the curing of the fiber material at elevated temperatures to form the composite structure, such as synthetic rubber, neoprene, etc. Similarly, the resilient member 136 may have any suitable thickness for such use depending upon the composite structure being formed. As illustrated, the coating material 204 on fibers 202 has been substantially flowed from around the fibers 202 of the fiber material 200 during the curing process to take the shape of the area formed between the consolidation blocks 24, the hard tooling 12, and the resilient member 136 backed-up by cover 130. In this manner, the profiled edges 26 of the consolidation blocks 24 act to control the placement of fibers 202 during formation and curing of the composite structure to provide accurate dimensional control of the composite structure formed. In this manner, dimensions may be precisely controlled for the composite structure and, more particularly, repeated to form additional composite structures using the hard tooling 12 and the consolidation blocks 24 of the consolidation medium 14 in conjunction with the consolidation of the layers 206 forming the shell or cover 212 of the composite structure while ribs 210 are formed between consolidation blocks 24. If desired, the resilient member 136 may be used without cover 130 during the curing of the composite structure if the resilient member 136 has sufficient strength for such use without substantial deflection or movement thereof.

Figure 14:
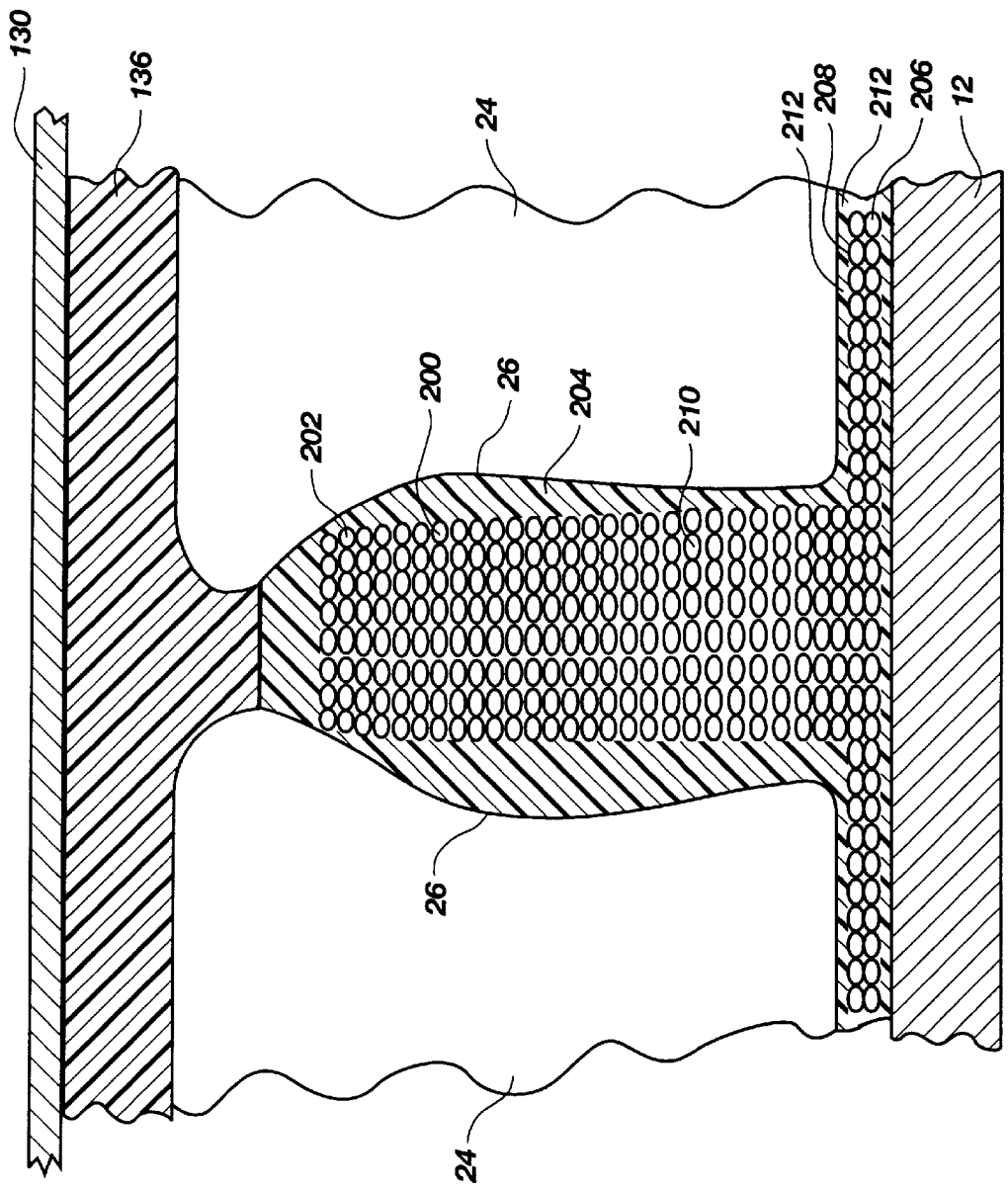
FIG. 14 is a cross-sectional view of a portion of the tooling for a fourth embodiment of the present invention.

Referring to drawing FIG. 14, a portion of a composite structure formed on hard tooling 12, or 112 (not shown), with consolidation blocks 24 of consolidation medium 14 and cover 130 is illustrated. As illustrated, the hard tooling 12 has one or more layers 206 of fiber material 200 thereon prior to the consolidation blocks 24 being placed on the hard tooling 12. If desired, the layers 206 of fiber material 200 are placed on the hard tooling 12 to form a cover or shell 212 followed by the placement of fiber material 200 thereon to form the ribs 210 on the cover or shell 212. In one instance, the ribs 210 may be formed from individual strands or as multiple strand tows on the hard tooling 12 prior to the use of the consolidation blocks 24. Alternately, after the consolidation blocks 24 are located on the hard tooling 12 after the application of the layers 206 thereon, the ribs 210 may be formed from individual strands or as multiple strand tows on the hard tooling 12 located between the consolidation blocks 24. As previously described, the consolidation blocks 24 each have a suitable vertical profile adjacent the composite structure being formed between the consolidation blocks 24. The purpose of the profiled edge 26 being to confine, control, and retain the fiber material 200 which includes fibers 202 and coating material 204 thereon during the lay-up of the fiber material 200 and the curing of the fiber material 200 to form a composite structure. A cover 130 is used during curing of the fiber material 200 to form the composite structure and a suitable resilient member 136 is located between the cover 130 and the fiber material 200 to confine and load the fiber material 200 during the curing thereof and in between and below the consolidation blocks 24. The resilient member 136 may be of any suitable material and thickness for use in the curing of the fiber material 200. As illustrated, the coating material 204 has been substantially flowed from around the fibers 202 of the fiber material 200 during the curing process.

Figure 15:
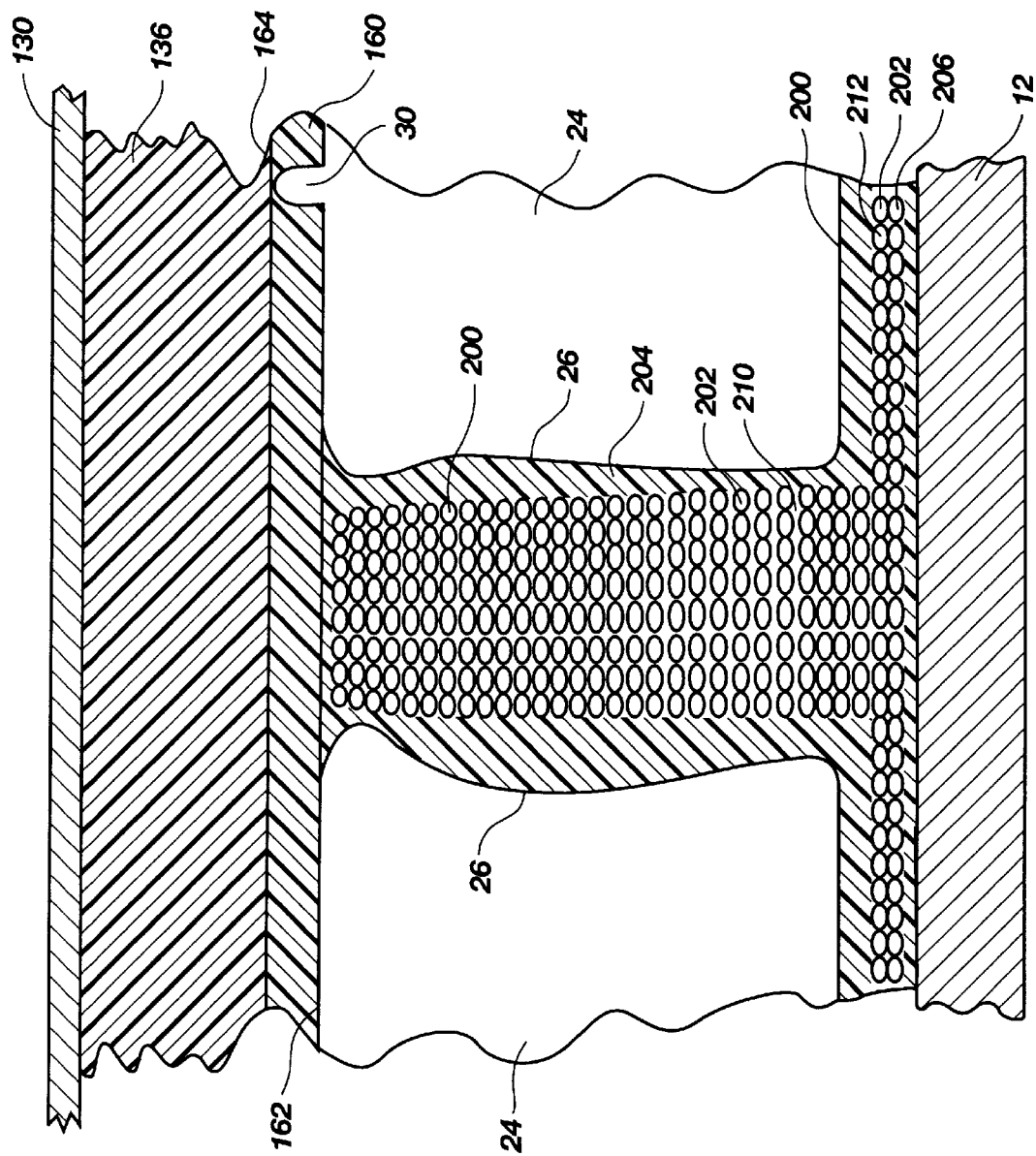
FIG. 15 is a cross-sectional view of a portion of the tooling for a fifth embodiment of the present invention.

Referring to drawing FIG. 15, a portion of a composite structure formed on hard tooling 12, or 112 (not shown), with consolidation blocks 24 of consolidation medium 14 and cover 130 is illustrated. As illustrated, the hard tooling 12 has one or more layers 206 of fiber material 200 thereon to form shell or cover 212 while layers of fiber material 200 are placed thereon to form ribs 210 prior to the consolidation blocks 24 being placed on shell or cover 212 and are placed between ribs 210. The fiber material 200 is placed on the hard tooling 12 to form the cover or shell 212 followed by the placement of the fiber material 200 on the cover or shell 212 to form the ribs 210 of the composite structure. Subsequently, a flexible, resilient sheet 160 having consolidation blocks 24 attached to the consolidation medium 14 is used to insert or locate the consolidation blocks 24 between ribs 210 prior to the curing of the fiber material 200. The consolidation blocks may be secured by any suitable means to the flexible, resilient sheet 160, such as by an adhesive 162 or by the pin or nub 30 of consolidation block 24 mating with an aperture 164 in the resilient sheet 160. The flexible, resilient member having sufficient flexibility and resiliency to allow positioning of the consolidation blocks 24 into the areas between the ribs 210 formed on the fiber material 200 on the hard tooling 12. The consolidation blocks 24 having a vertical profiled edge 26 thereon adjacent the composite structure, such as a rib 210, being formed between the consolidation blocks 24 to control the fiber material 200 during the curing thereof. A cover 130 is used during the curing of the fiber material 200 to form a composite structure and a suitable resilient member 136 is located between the flexible, resilient sheet 160 retaining consolidation blocks 24 thereon and the cover 130 to confine and load the fiber material 200 during the curing thereof. The resilient member 136 may be of any suitable material and thickness for use in the curing of the fiber material 200. As illustrated, the coating material 204 on the fiber material 200 has been substantially flowed from around the fibers 202 during the curing process.

Figure 16:
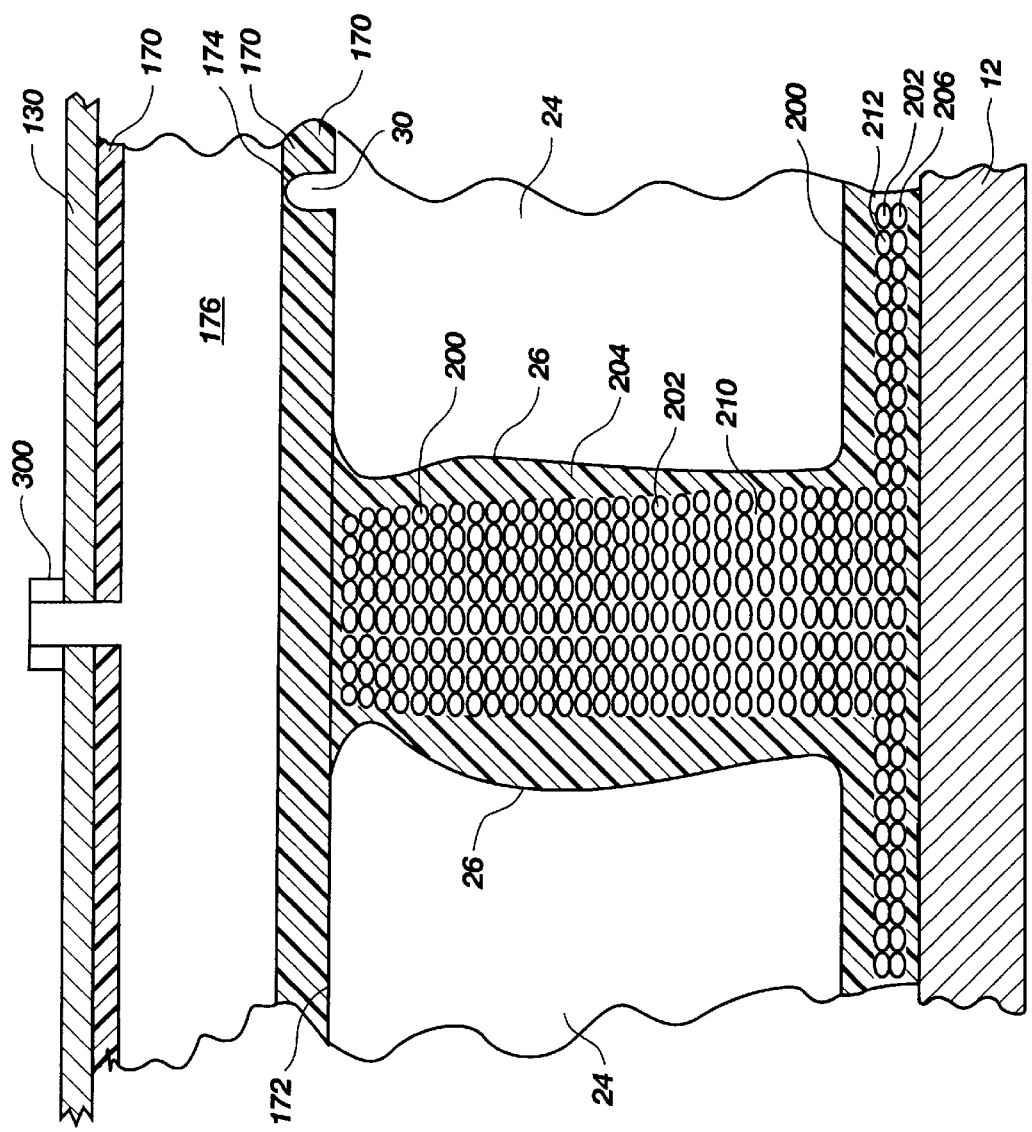
FIG. 16 is a cross-sectional view of a portion of the tooling for a sixth embodiment of the present invention.

Referring to drawing FIG. 16, a portion of a composite structure on hard tooling 12, or 112 (not shown), with consolidation blocks 24 of consolidation medium 14 and cover 130 is illustrated. As illustrated, the hard tooling 12 has one or more layers 206 of fiber material 200 thereon to form shell or cover 212 while layers of fiber material 200 are placed thereon to form ribs 210 prior to the consolidation blocks 24 being placed on the hard tooling 12 to form the cover or shell 212 and are placed between ribs 210. The fiber material 200 is placed on the hard tooling 12 to form the cover or shell 212 followed by the placement of the fiber material 200 on the cover or shell 212 to form the ribs 210 of the composite structure. Subsequently, a flexible, resilient member 170 having cavity 176 and apertures 174 therein and having consolidation blocks 24 attached thereto, the consolidation medium, is used to insert or locate the consolidation blocks 24 between the ribs 210 prior to the curing of the fiber material 200. The consolidation blocks 24 may be secured by any suitable means to the flexible, resilient member 170, such as by adhesive 172 or the pin or nub 30 of consolidation block 24 mating with an aperture 174 in the resilient member 170. The resilient member 170 having cavity 176 therein connected to aperture 300 in cover 130 to allow for the application of fluid pressure to the resilient member 170 either to help facilitate the insertion of the consolidation blocks 24 between the ribs 210 or during the curing process of the fiber material 200, or both. Any suitable fluid may be used in the cavity 176, such as compressed air, inert gas, etc. The flexible, resilient member 170 having sufficient flexibility and resiliency to allow positioning of the consolidation blocks 24 into the areas between the ribs 210 formed on the fiber material 200 forming the shell or cover 210 on the hard tooling 12. The consolidation blocks 24 having a vertical profiled edge 26 adjacent the composite structure, such as a rib 210, being formed between the consolidation blocks 24 to control the fiber material during the curing thereof. A cover 130 is used in addition to the resilient 170 during the curing of the fiber material 200 to form a composite structure. The resilient member 170 may be of any suitable material and thickness to confine and load the fiber material 200 during the curing thereof. As illustrated, the coating material 204 on the fiber material 200 has been substantially flowed from around the fibers 202 during the curing process.

Figure 17:
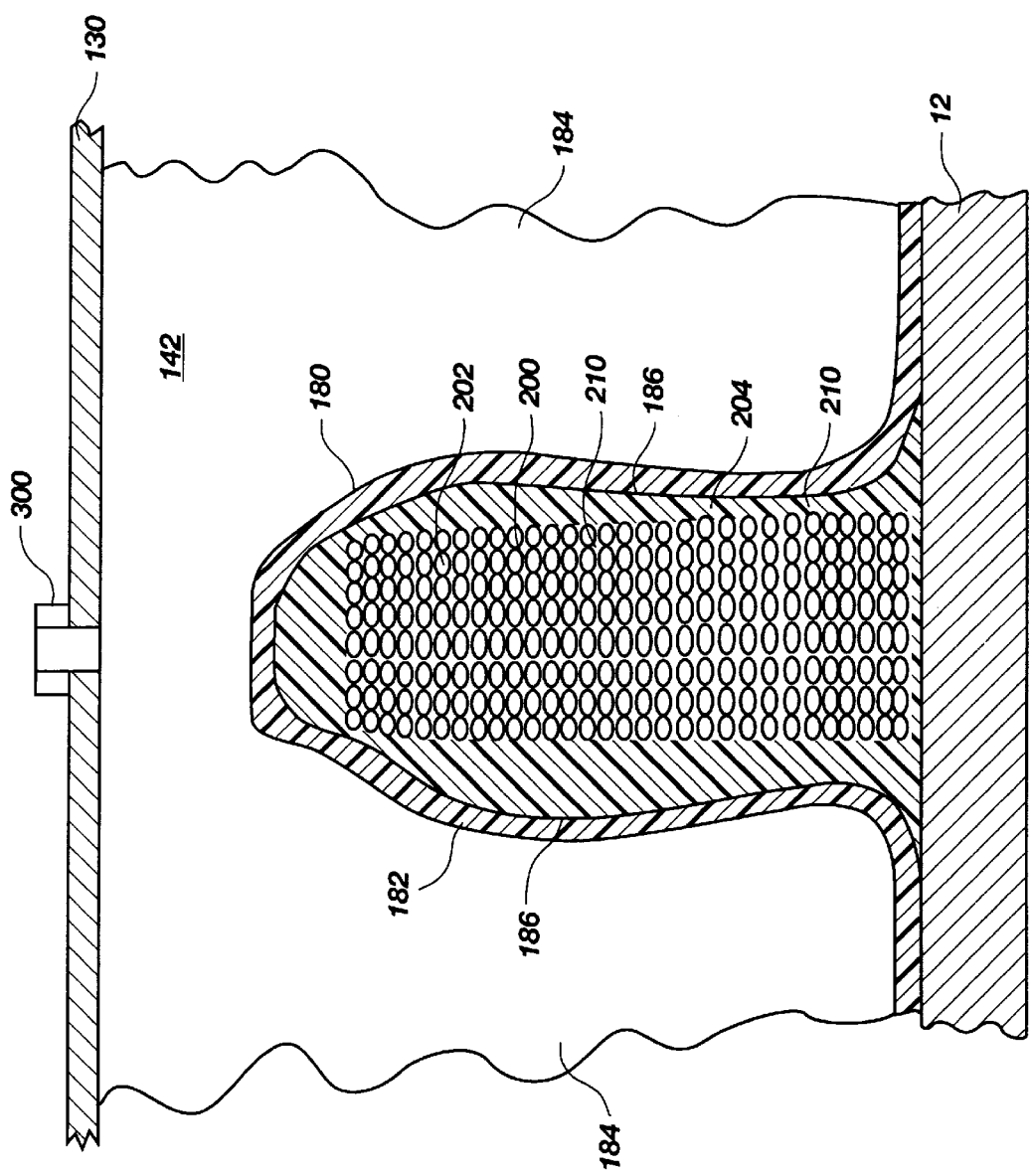
FIG. 17 is a cross-sectional view of a portion of the tooling for a seventh embodiment of the present invention.

Referring to drawing FIG. 17, a portion of a composite structure formed on hard tooling 12, or 112 (not shown) with flexible, resilient mold member 180 of the consolidation medium 14 is illustrated. As illustrated, a rib 210 is formed on hard tooling 12 of fiber material 200 of fibers 202 having coating material 204 thereon. The resilient member 180 of the consolidation medium 14 is formed of flexible, resilient material having a predetermined configuration or shape desired for the curing of the fiber material 200 located on hard tooling 12. The resilient 180 may be of any suitable material for use in the curing of the fiber material 200, such material having sufficient strength to retain its shape during the curing process and confine the fiber material 200 forming a rib 210 or the like of the composite structure during curing as well as sufficient resiliency to allow the insertion of the member 180 into the areas between ribs 210 formed on the hard tooling 12. The resilient 180 may be a silicon elastomeric material, rubber, synthetic rubber, neoprene, etc. reinforced with a suitable fabric material, such as nylon, Kevlar, metal, etc. The resilient 180 may be formed into the desired shape, such as by compression molding. The resilient 180 may have the portions 182 having profile 186 thereon used to confine the fiber material 200 forming the ribs 210 of the composite structure having any desired profile either vertically or cross-sectionally, as desired, to yield the desired rib structure 210 after curing. The resilient member 180 is applied or installed on the hard tooling 12 after the application of the fiber material 200 to form the un-cured rib 210 on the hard tooling 12. The resilient member 180 is applied to the hard tooling 12 over the ribs 210 of fiber material 200 formed thereon with the portions 182 of the resilient member 180 applied over the ribs 210 and with the remaining portions of the resilient member 180 abutting the hard tooling 12. During the curing process of the fiber material 200, the resilient member 180 is loaded to compress the fiber material 200 by the application of a suitable amount of pressure, such as compressed air or an inert gas, through aperture 300 in cover 130 into the area 142 between the cover 130 and resilient member 180 to compress the resilient member 180 about the rib 210 during curing and against hard tooling 12 to control the shape of the rib 210 during curing and the flow of coating material 204 on the fibers 202 during the curing process with the profile 186 on the portion 182 providing the cross-sectional shape control of the rib 210. As previously described, the fiber material 200 may be applied as individual strands or as tows of strands to form the rib 210 on the hard tooling 12. As illustrated, the profile 186 of portion 182 of the resilient member 180 forms a rib 210 during curing having a cross-sectional shape similar to that when consolidation blocks 24 are used during the curing process.

Figure 18:
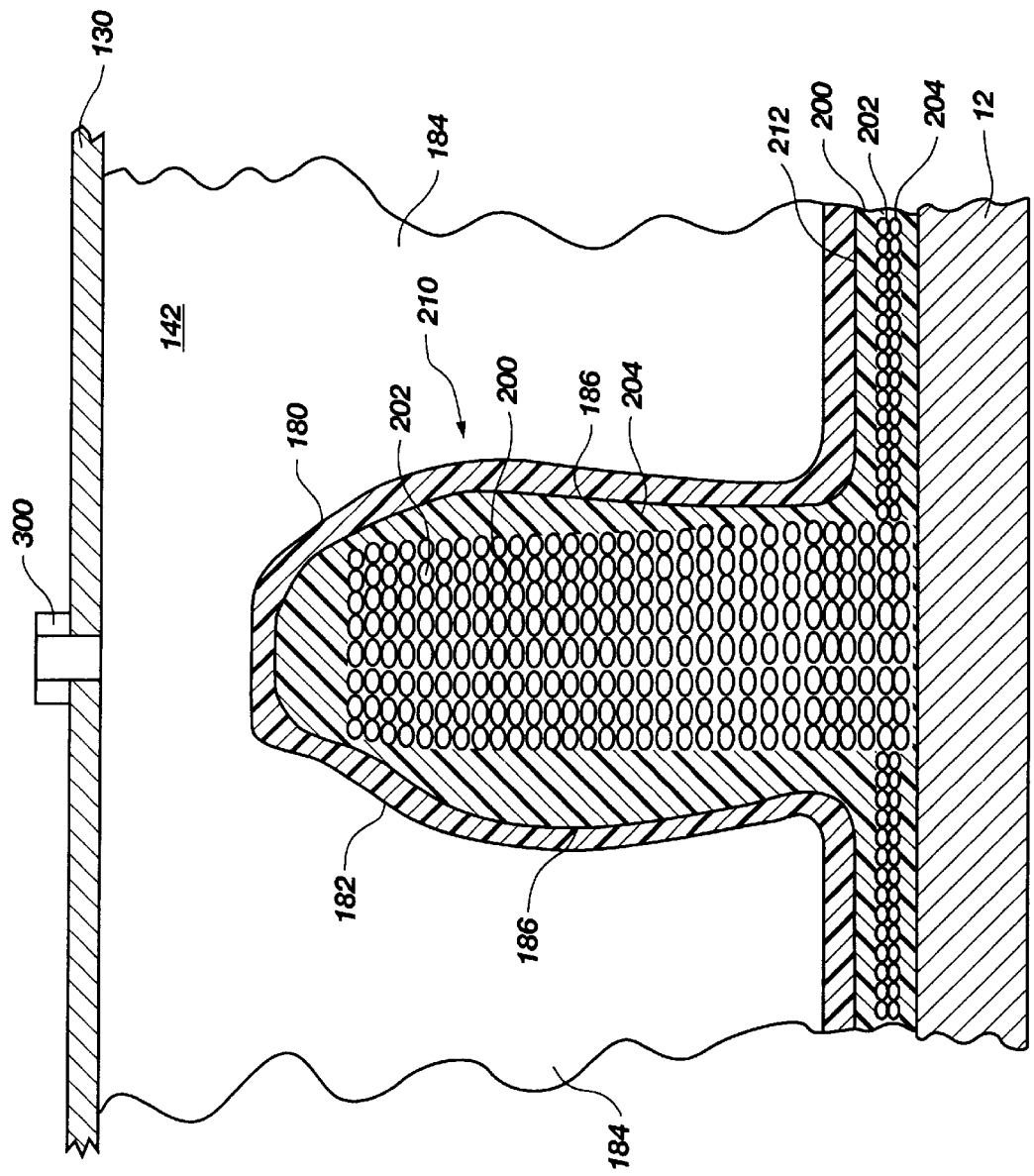
FIG. 18 is a cross-sectional view of a portion of the tooling for a eighth embodiment of the present invention.

Referring to drawing FIG. 18, a portion of a composite structure formed on hard tooling 12, or 112 (not shown), with flexible, resilient mold member 180 of the consolidation medium 14 is illustrated. As illustrated, a cover or shell 212 of fiber material 200 is formed on hard tooling 12 prior to the rib 210 of fiber material 200 being formed on the hard tooling 12. After the cover or shell 212 and rib 210 of fiber material 200 is formed, the flexible, resilient member 180 having portion 182 having profile 186 is installed over ribs 210 and cover or shell 212 prior to the curing of the fiber material 200. The resilient member 180 of the consolidation medium 14 being loaded by suitable pressure, such as air pressure or inert fluid pressure, through aperture 300 in cover 130 into the area 142 between the cover 130 and resilient member 180 to compress the resilient member 180 about the rib 210 and against cover or shell 212 during curing and against hard tooling 12 to control the shape of the cover 212 and rib 210 of the composite structure. As previously described, the fiber material 200 may be applied in sheets for cover or shell 212 and applied as individual strands or tows of strands to form the rib 210 on hard tooling 12.

Figure 19:
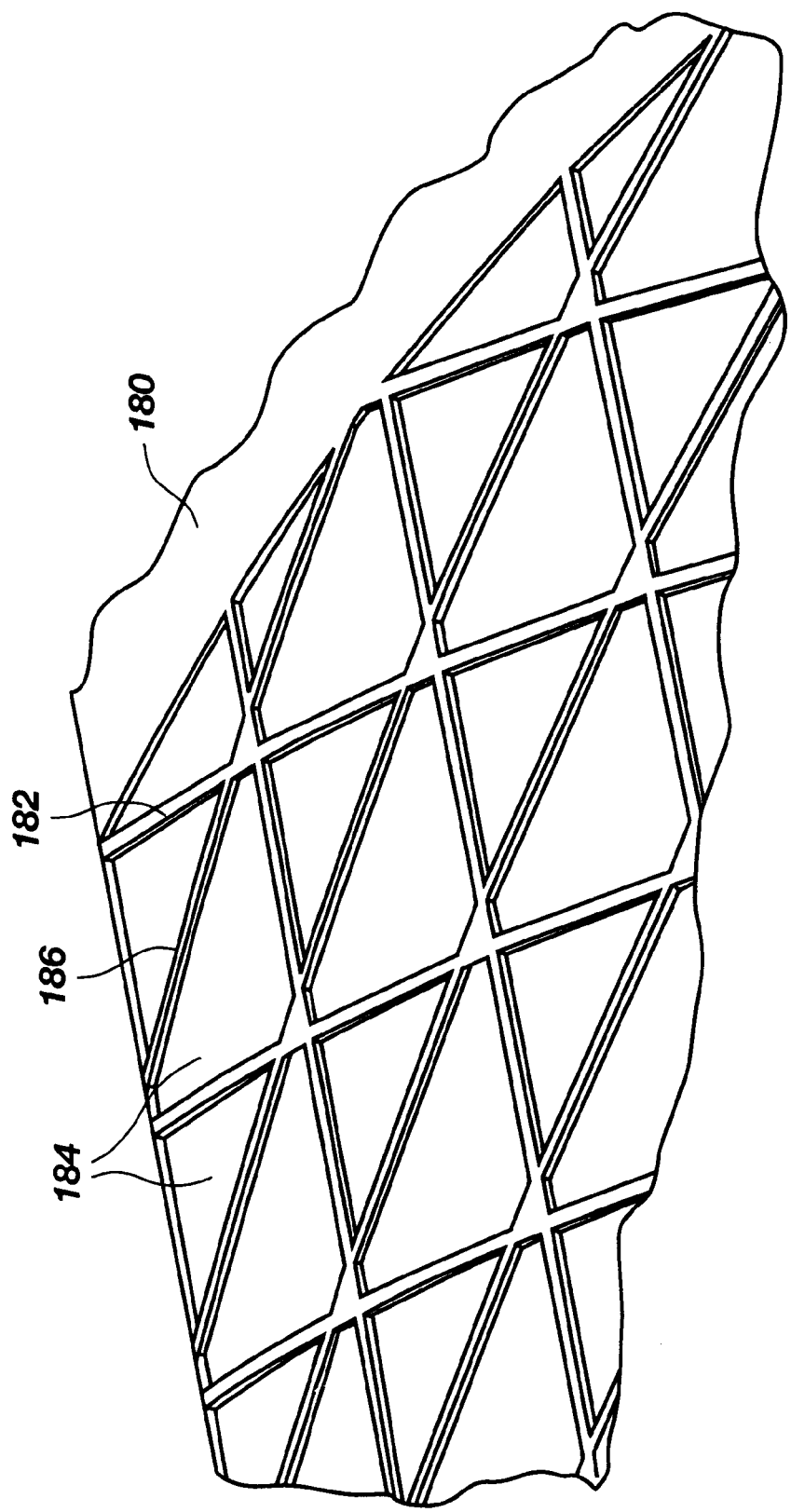
FIG. 19 is a top view of a portion of the tooling used for the seventh and eighth embodiment of the present invention.

Referring to drawing FIG. 19, a portion of the resilient member 180 of the consolidation medium 14 is illustrated. The resilient member 180 includes portions 182 having profiles 186 thereon which cover ribs 210 during the curing process and recessed pockets 184 which extend between the ribs 210, the portions 182 contacting hard tooling 12 or fiber material 200 on the hard tooling 12 during the curing process of the fiber material 200. The resilient member 180 may be formed in a substantially flat sheet or any desired shape, such as cylindrical, annular, conical, etc.

Figure 20:
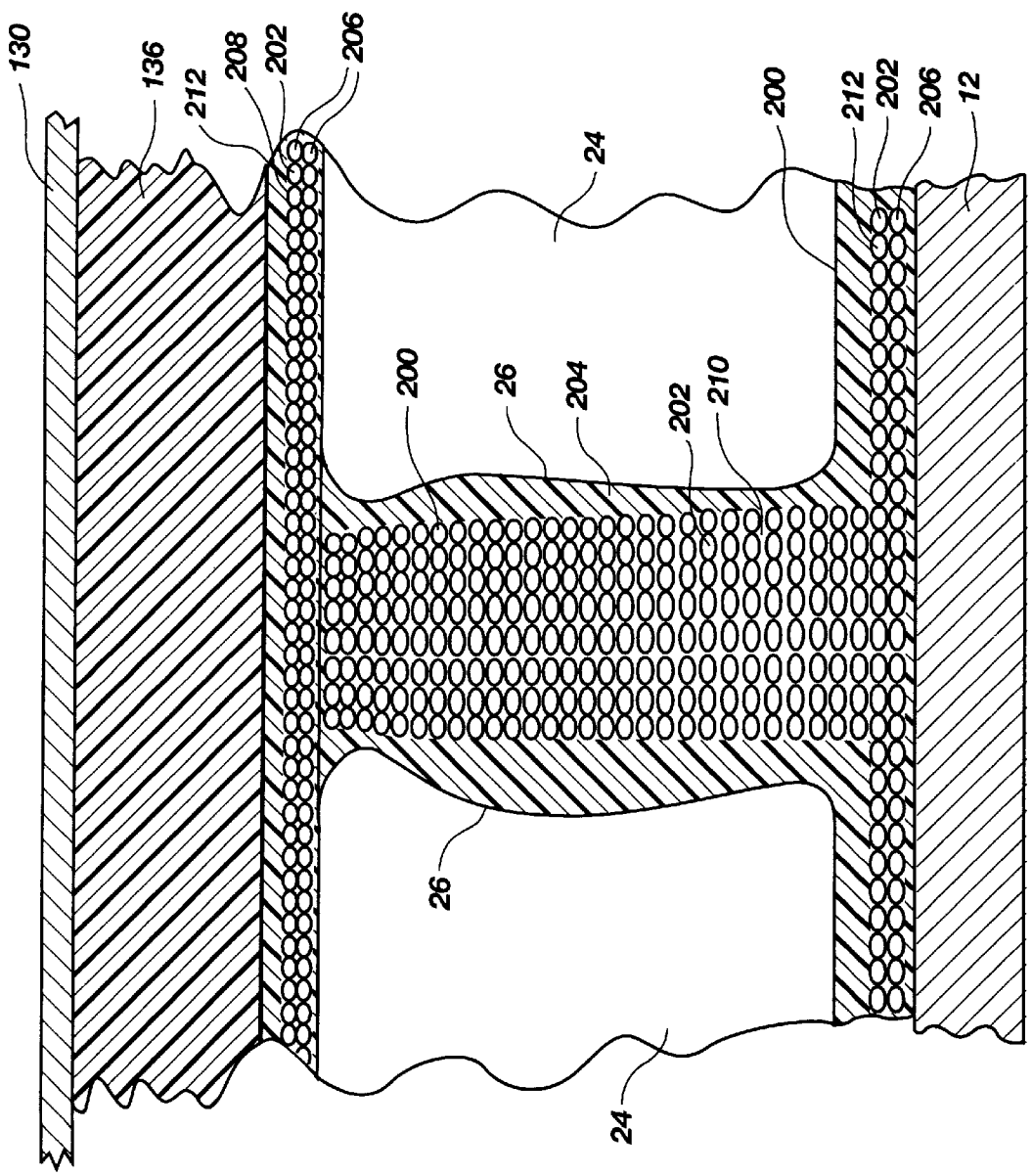
FIG. 20 is a cross-sectional view of a portion of the tooling for a ninth embodiment of the present invention.

Referring to drawing FIG. 20, a portion of a composite structure formed on hard tooling 12, or 112 (not shown), with consolidation blocks 24 of the consolidation medium 14 and cover 130 is illustrated. The consolidation blocks 24 have profiled edge 26 having a suitable profile adjacent the composite structure being formed therebetween on hard tooling 12. The profiled edge 26 may be of any suitable shape and may vary from consolidation block 24 to adjacent consolidation block 24, as illustrated. The purpose of the profiled edge 26 on the consolidation block 24 is to confine and retain the fiber material 200 which includes fiber 202 and coating material 204 thereon, either as individual strands or as multiple strand tows on the hard tooling 12 during the lay-up or curing or both of the fiber material 200 to form the composite structure. Additionally illustrated are multiple layers 206 of fibers 202 having coating 208 thereon which are placed, initially, on the hard tooling 12 to form an inner shell or cover 212 before the layers 206 forming ribs 210 thereover and, subsequently, on the ribs 210 after the formation thereof to form an outer cover or shell 212. The consolidation blocks 24 may be placed on layer 206 before the formation of the ribs 210 or placed in between the ribs 210 after their formation on layers 206 on hard tooling 12 but before the curing of the fiber material. The consolidation blocks 24 remain in the cured composite structure to provide rigidity and strength thereto as well as control the curing of the covers or shells 212 as well as the ribs 212 during the curing of the fiber material 200. The resilient member 136 may be of any suitable resilient material for use in the curing of the fiber material at elevated temperatures to form the composite structure, such as synthetic rubber, neoprene, etc. As illustrated, the coating material 204 on fibers 202 has been substantially flowed around the fibers 202 of fiber material 200 during the curing process to take the shape of the area formed between the consolidation blocks 24, the hard tooling 12, and the resilient member 134 backed-up by cover 130. In this manner, the profiled edges 26 of the consolidation blocks 24 act to control the placement and/or movement of fibers 202 during formation and curing of the composite structure to provide accurate dimensional control of the composite structure.

Referring to drawing FIGS. 1 through 20, to form the desired composite structure, the hard tooling 12 or 112 is formed having the desired recessed pockets 18 or 118 formed therein, apertures 20 formed therein, and ribs 22 or 122 formed between recessed pockets 18 or 118. The desired shape consolidation blocks 24 of the consolidation medium 14 having the desired profiled edges 26 thereon are formed to mate with the corresponding recessed pockets 18 or 184 of the hard tooling 12 or 112 to form the desired composite structure. The consolidation blocks 24 may be retained within apertures 20 by any suitable apparatus as described herein. A mating piece of tooling 42 is formed with recessed pockets 48 therein and ribs 22 thereon to mate with the consolidation blocks 24 and hard tooling 12. Alternately, a cover 130 is formed to mate with hard tooling 112 as well as a resilient member 136 or 138. If the consolidation blocks 24 are not used during curing of the fiber material, the flexible, resilient member 170 or 180 or a flexible, resilient sheet 160 having consolidation blocks 24 thereon may be used to consolidate the fiber material.

After the hard tooling 12 or 112 has been assembled having the desired consolidation blocks 24 thereon, fiber material 200 is placed or applied in the area formed between the ribs 22 or 122 or hard tooling 12 or 112, respectively, and the adjacent consolidation blocks 24 to form the composite structure. The fiber material may be placed in such areas using suitable equipment and apparatus and methods known in the industry as desired by placing individual coated fibers or multi-strand fiber tows of fiber material 200 either continuously or in discreet length segments.

After the desired amount of fiber material 200 has been applied to the hard tooling 12 or 112 between the consolidation blocks 24, the hard tooling 12 and the consolidation blocks 24 are covered with a mating piece of tooling 42. Alternately, the fiber material 200 forming ribs 210 or ribs 22 and cover or shell 212 is covered with a resilient member 136 or 138 and, if desired, a cover 130 for the curing of the fiber material 200 at elevated temperatures to form the composite structure. After curing of the fiber material 200 to form the composite structure, the cover 130 and resilient member 136 or 138 is removed from the hard tooling 12 or 112 and consolidation blocks 24. If necessary because of the shape of the profiled edge 26 on the consolidation blocks 24, the consolidation blocks 24 may be removed next leaving the composite structure on the hard tooling 12 or 112 for subsequent removal therefrom. If the composite structure is in annular form, such as illustrated in drawing FIGS. 7 and 8, the cover 130 is removed and the hard tooling 112 is removed from the interior of the annular composite structure by disassembling the hard tooling for removal from the structure. Alternately, the cover or shell 212 is formed on hard tooling 12 or 112 from fiber material in sheet form with the ribs 210 being formed thereon from fiber material 200. The fiber material 200 is cured using flexible, resilient sheet 160 or resilient member 180 to control the fiber material 200 during curing.

The use of the present invention of hard tooling 12 or 112, the consolidation blocks 24, resilient sheet 136 or 138, the flexible, resilient member 160, resilient members 170, 180, if desired, cover 130 allows the repeated manufacture of desired composite structures having the desired dimensions thereof thereby producing a composite structure with minimal variations therein.

The hard tooling 12 or 112 in conjunction with the consolidation blocks 24 which are retained precisely within recessed pockets 18 or 184 of the hard tooling 12 or 112 or on the flexible, resilient sheet 160 or resilient member 170 or the flexible, resilient member 180 molded to the desired composite structure shape, respectively, provide for precise dimensional control of the composite structure being formed with minimal variations therein. The hard tooling 12 or 112, consolidation blocks 24, flexible, resilient sheet 160, and flexible, resilient member 170 or 180 may be formed in any desired configuration to form any desired composite structure having any desired shape, such as flat, annular, cylindrical, etc.

Those skilled in the art will recognize changes, variations, additions, and deletions of the hard tooling, consolidation blocks, resilient members, and covers illustrated herein that are within the scope of the invention and the teachings of the invention. Such are covered within the scope of the claim invention.

What is claimed is:

1. An apparatus for the formation of a composite structure, said apparatus comprising:

forming a hard tooling having at least two recessed pockets therein and at least one rib extending between a portion of said at least two recessed pockets;

a consolidation medium having a portion thereof engaging a portion of said at least two recessed pockets in said hard tooling; and a resilient member for covering portions of said hard tooling and said consolidation medium.

2. The apparatus of claim 1, further comprising:

a cover for covering portions of said hard tooling and said consolidation medium.

3. The apparatus of claim 1, further comprising:

a cover for covering a portion of said resilient member.

4. The apparatus of claim 1, wherein said consolidation medium comprises:

at least two consolidation blocks, each consolidation block being retained in at least a portion of a recessed pocket of said at least two recessed pockets of said hard tooling.

5. The apparatus of claim 1, wherein said hard tooling further comprises:

each recessed pocket of said at least two recessed pockets having at least one aperture therein.

6. The apparatus of claim 5, wherein said hard tooling further comprises:

at least two consolidation blocks, each consolidation block being retained in at least a portion of a recessed pocket of said at least two recessed pockets of said hard tooling, each consolidation block having a retaining apparatus thereon for mating with the aperture in each recessed pocket of said at least two recessed pockets of said hard tooling.

7. The apparatus of claim 6, wherein the retaining apparatus includes a pin.

8. The apparatus of claim 6, wherein the retaining apparatus includes said resilient member.

9. The apparatus of claim 2, wherein said cover comprises a member having at least two recessed pockets therein and at least one rib extending between a portion of said at least two recessed pockets, said at least two recessed pockets for receiving a portion of said consolidation medium therein.

10. The apparatus of claim 1, wherein said hard tooling is substantially flat.

11. The apparatus of claim 1, wherein said hard tooling is annular in shape.

12. The apparatus of claim 2, further comprising:

said cover being substantially annular in shape.

13. The apparatus of claim 1, wherein said hard tooling is any desired shape.

14. The apparatus of claim 12, wherein said cover is any desired shape.

15. The apparatus of claim 1, wherein said consolidation medium is any desired shape.

16. The apparatus of claim 1, wherein said resilient member is substantially solid.

17. The apparatus of claim 1, wherein said resilient member is inflatable.

18. The apparatus of claim 1, wherein said consolidation medium includes said resilient member having at least one consolidation block attached thereto.

19. The apparatus of claim 1, wherein said consolidation medium includes a flexible, resilient member having at least one consolidation block secured thereto.

20. The apparatus of claim 19, wherein said flexible, resilient member includes a chamber therein.

21. The apparatus of claim 20, wherein said flexible, resilient member includes an inflatable member.

22. The apparatus of claim 19, wherein said at least one consolidation block is adhesively secured to said flexible, resilient member.

23. The apparatus of claim 19, wherein said at least one consolidation block is mechanically secured to said flexible, resilient member.

24. The apparatus of claim 1, wherein said consolidation medium includes an inflatable consolidation medium.

25. The apparatus of claim 1, wherein said consolidation medium includes a reinforced, inflatable consolidation medium having at least a portion thereof having, in turn, a profile thereon.

26. A method of forming an apparatus for the formation of a composite structure formed of fibers coated with resin, said method comprising:

forming a hard tooling having a surface having at least two recessed pockets therein, said surface for contacting a portion of said fibers coated with resin;

forming a consolidation medium having a portion thereof for engaging a portion of said at least two recessed pockets of said hard tooling and having a portion for contacting a portion of said fibers coated with resin.

27. The method of claim 26, wherein said forming said consolidation medium includes forming a consolidation medium having a portion thereof including a resilient member.

28. The method of claim 26, wherein said forming said consolidation medium includes forming a consolidation medium having a portion thereof including at least one consolidation block.

29. The method of claim 26, further comprising:

forming a cover for covering portions of said hard tooling and said consolidation medium.

30. A method of forming an apparatus for the formation of a composite structure, said method comprising:

forming a hard tooling having at least two recessed pockets therein and at least one rib extending between a portion of said at least two pockets;

forming a consolidation medium having a portion thereof for engaging a portion of said at least two recessed pockets in said hard tooling; and forming a resilient member for covering portions of said hard tooling and for covering said consolidation medium.

31. The method of claim 30, further comprising:
forming a cover for covering portions of said hard tooling and said consolidation medium.

32. The method of claim 30, further comprising:
forming a cover for covering a portion of said resilient member.

33. The method of claim 30, wherein said forming said consolidation medium comprises:
forming at least two consolidation blocks, each consolidation block being formed to be retained in at least a portion of a recessed pocket of said at least two recessed pockets of said hard tooling.

34. The method of claim 30, wherein said forming said hard tooling further comprises:
forming each recessed pocket of said at least two recessed pockets having at least one aperture therein.

35. The method of claim 30, wherein said forming said hard tooling further comprises:
forming at least two consolidation blocks, each consolidation block being formed to be retained in at least a portion of a recessed pocket of said at least two recessed pockets of said hard tooling, each consolidation block being formed having a retaining apparatus thereon for mating with an aperture in each recessed pocket of said at least two recessed pockets of said hard tooling.

36. The method of claim 35, wherein the retaining apparatus includes a pin.

37. The method of claim 35, wherein the retaining apparatus includes a resilient member.

38. The method claim 31, wherein said forming said cover comprises forming a member having at least two recessed pockets therein and at least one rib extending between a portion of said at least two recessed pockets, said at least two recessed pockets for receiving a portion of said consolidation medium therein.

39. The method of claim 30, wherein said forming said hard tooling comprises forming said hard tooling as substantially flat.

40. The method of claim 30, wherein said forming said hard tooling comprises forming said hard tooling annular in shape.

41. The method of claim 40, further comprising:
forming a cover substantially annular in shape.

42. The method of claim 30, wherein said forming said hard tooling comprises forming said hard tooling to any desired shape.

43. The method of claim 41, wherein said forming said cover comprises forming said cover to any desired shape.

44. The method of claim 30, wherein said forming said consolidation medium comprises forming said consolidation medium to any desired shape.

45. The method of claim 31, wherein said resilient member is substantially solid.

46. The method of claim 30, wherein said resilient member is inflatable.

47. A method of forming a composite structure, said method comprising:
providing hard tooling formed having a surface;
providing consolidation medium, said consolidation medium including at least two consolidation blocks secured to a resilient member;
applying a first composite material on the surface of said hard tooling; and
contacting a portion of said consolidation medium with a portion of said first composite material.

48. The method of claim 47, further comprising:
providing a member covering portions of said hard tooling and said consolidation medium.

49. The method of claim 47, further comprising:
providing said resilient member covering portions of said hard tooling and said consolidation medium.

50. The method of claim 47, further comprising:
providing a cover for covering portion of said hard tooling and said consolidation medium.

51. The method of claim 47, further comprising:
applying a second composite material on said first composite material.

52. The method of claim 51, further comprising:
applying a third composite material on said second composite material.

53. The method of claim 47, wherein said consolidation medium comprises:
a flexible member having a surface in contact with a portion of said first composite material.

54. The method of claim 52, wherein said consolidation medium comprises:
a flexible member having a surface thereof in contact with a portion of said first composite material and a portion of said second composite material.

55. The method of claim 52, wherein said consolidation medium comprises:
a member having a surface thereof in contact with a portion of said first composite material, a surface thereof in contact with a portion of said second composite material, and a surface thereof in contact with a portion of said third composite material.

56. A method of forming a composite structure, said method comprising:
providing hard tooling formed having at least two recessed pockets therein and at least one rib extending between a portion of said at least two pockets;
providing consolidation medium having a portion thereof engaging a portion of said at least two recessed pockets in said hard tooling; and
applying composite material on said hard tooling.

57. The method of claim 56, further comprising:
providing a resilient member covering portions of said hard tooling and said consolidation medium.

58. The method of claim 56, further comprising:
providing a cover for covering portions of said hard tooling and said consolidation medium.

59. The method of claim 57, further comprising:
providing a cover for covering a portion of said resilient member.

60. The method of claim 56, wherein said consolidation medium comprises:
at least two consolidation blocks, each consolidation block being retained in at least a portion of a recessed pocket of said at least two recessed pockets of said hard tooling.

61. The method of claim 56, wherein said hard tooling further comprises:
each recessed pocket of said at least two recessed pockets having at least one aperture therein.

62. The method of claim 61, where in said hard tooling further comprises:
at least two consolidation blocks, each consolidation block being retained in at least a portion of a recessed pocket of said at least two recessed pockets of said hard tooling, each consolidation block having a retaining apparatus thereon for mating with the aperture in each recessed pocket of said at least two recessed pockets of said hard tooling.

63. The method of claim 62, wherein the retaining apparatus includes a pin.

64. The method of claim 62, wherein the retaining apparatus includes a resilient member.

65. The method of claim 58, wherein said cover comprises a member having at least two recessed pockets therein and at least one rib extending between a portion of said at least two recessed pockets, said at least two recessed pockets for receiving a portion of said consolidation medium therein.

66. The method of claim 56, wherein said hard tooling is substantially flat.

67. The method of claim 56, wherein said hard tooling is annular in shape.

68. The method of claim 56, further comprising:

a cover being substantially annular in shape.

69. The method of claim 56, wherein said hard tooling is any desired shape.

70. The method of claim 68, wherein said cover is any desired shape.

71. The method of claim 56, wherein said consolidation medium is any desired shape.

72. The method of claim 57, wherein said resilient member is substantially solid.

73. The method of claim 57, wherein said resilient member is inflatable.

74. The method of claim 56, further comprising:

curing said composite material.

75. The method of claim 56, further comprising:

curing said composite material at an elevated temperature.

76. Apparatus for the formation of a composite structure formed of a plurality of fibers coated with resin, said apparatus comprising:

hard tooling formed having at least two recessed pockets therein and at least one rib extending between a portion of said at least two pockets, said at least one rib for contacting portions of said plurality of fibers coated with resin; and consolidation medium having a portion thereof engaging a portion of said at least two recessed pockets in said hard tooling and a portion for contacting a portion of said plurality of fibers coated with resin.

77. A method of forming an apparatus for the formation of a composite structure formed of a plurality of fibers coated with resin, said method comprising:

forming a hard tooling having at least two recessed pockets formed therein and at least one rib extending between a portion of said at least two recessed pockets, said at least one rib for contacting portions of said plurality of fibers coated with resin; and forming a consolidation medium having a portion thereof for engaging a portion of said at least two recessed pockets in said hard tooling and having a portion for contacting a portion of said plurality of fibers coated with resin.

78. A method of forming a composite structure, said method comprising:

providing forming a hard tooling having a surface having at least two recessed pockets formed therein;

providing a consolidation medium to engage said at least two recessed pockets in said hard tooling;

applying a first composite material on the surface of said hard tooling; and contacting a portion of said consolidation medium with a portion of said first composite material.

* * * * *

UNITED STATES PATENT AND TRADEMARK OFFICE
CERTIFICATE OF CORRECTION

PATENT NO.     : 6,149,851
DATED          : November 21, 2000
INVENTOR(S)    : Mark E. Deckers et al.

It is certified that error appears in the above-identified patent and that said Letters Patent is hereby corrected as shown below:

Title page,
Item [56], References Cited, before "10/1989" change "4,877,183" to -- 4,877,193 --, change "Youngkelt" to -- Youngkeit --, after "2,782,469" insert -- * --, after "3,290,421"insert -- * --, after "3,363,875" insert -- * --, after "4,702,870" insert -- * --, after "4,881,714" insert -- * --, after "5,131,834" insert -- * --, after "5,152,949" insert -- * --, after "5,876,835" and insert -- * --, after "221120" insert -- * --, after "63-183831" insert -- * --

Column 5,
Line 17, after "may" and "before "formed" insert -- be --
Line 28, after "the" and before "tooling" insert -- hard --

Column 7,
Line 60, delete "containing"

Column 10,
Line 7, after "resilient" and before "170" insert -- member --
Lines 23, 30 and 33, after "resilient" and before "180" insert -- member --
Line 35, before "180" insert -- member --

Column 11,
Line 56, after "ribs" change "212" to -- 210 --
Line 65, change "134" to -- 136, --

Column 12,
Line 60, change "sheet" to -- member --
Line 61, before "160" change "member" to -- sheet --

Column 13,
Line 16, change "claim" to -- claimed --
Line 19, before "formation" delete "the"

Column 14,
Line 35, before "formation" delete "the"

UNITED STATES PATENT AND TRADEMARK OFFICE
CERTIFICATE OF CORRECTION

PATENT NO.   : 6,149,851
DATED        : November 21, 2000
INVENTOR(S)  : Mark E. Deckers et al.

It is certified that error appears in the above-identified patent and that said Letters Patent is hereby corrected as shown below:

Column 15,
Line 53, change "31" to -- 30 --
Line 59, before "hard" insert -- forming a -- and delete "formed"

Column 16,
Line 34, before "hard" insert -- forming a -- and delete "formed"
Line 36, after "two" and before "pockets" insert -- recessed --
Line 37, after "providing" and before "consolidation" insert -- a --
Line 40, after "applying" and before "composite" insert -- a --
Line 60, change "where in" to -- wherein --

Column 17,
Line 34, change "Apparatus" to -- An apparatus --

Column 18,
Line 1, before "hard" insert -- forming a -- and delete "formed"
Line 3, after "two" and before "pockets" insert -- recessed --
Line 6, before "consolidation" insert -- a --

Signed and Sealed this

Twenty-sixth Day of August, 2003

JAMES E. ROGAN
*Director of the United States Patent and Trademark Office*